United States Patent [19]
Hurst, Jr.

[11] Patent Number: 5,631,887
[45] Date of Patent: May 20, 1997

[54] PULSE WIDTH MODULATION OPTICAL DISK DRIVE WITH ADJUSTABLE PULSED LASER WRITE AND PREHEAT PATTERNS

[75] Inventor: Jerry E. Hurst, Jr., San Jose, Calif.

[73] Assignee: International Business Machines Corporation, Armonk, N.Y.

[21] Appl. No.: 640,392

[22] Filed: Apr. 30, 1996

[51] Int. Cl.$^6$ .................................................. G11B 7/00
[52] U.S. Cl. .......................... 369/59; 369/116; 369/58; 369/47
[58] Field of Search ............................ 369/59, 116, 54, 369/58, 42, 47, 50, 48, 32, 13

[56] References Cited

U.S. PATENT DOCUMENTS

| | | | |
|---|---|---|---|
| 4,473,829 | 9/1984 | Schouhamer Immink et al. | 346/1.1 |
| 4,488,277 | 12/1984 | McFarlane et al. | 369/48 |
| 4,774,522 | 9/1988 | Van Tongeren et al. | 346/1.1 |
| 4,866,692 | 9/1989 | Saito et al. | 369/59 |
| 4,873,680 | 10/1989 | Chung et al. | 369/59 |
| 4,998,237 | 3/1991 | Osakabe et al. | 369/109 |
| 5,289,453 | 2/1994 | Ohno et al. | 369/100 |
| 5,339,298 | 8/1994 | Saito | 369/13 |
| 5,345,434 | 9/1994 | Ide et al. | 369/124 |
| 5,400,313 | 3/1995 | Belser et al. | 369/116 |
| 5,457,666 | 10/1995 | Toda et al. | 369/13 |
| 5,463,600 | 10/1995 | Kirino et al. | 369/13 |
| 5,530,688 | 6/1996 | Hurst, Jr. et al. | 369/116 |

FOREIGN PATENT DOCUMENTS

| | | |
|---|---|---|
| 594406A2 | 4/1994 | European Pat. Off. |
| 597656A2 | 5/1994 | European Pat. Off. |

*Primary Examiner*—Muhammad N. Edun
*Attorney, Agent, or Firm*—Thomas R. Berthold

[57] ABSTRACT

A pulse width modulation (PWM) optical disk drive calibrates the write and preheat pulse patterns generated by the laser to a particular media and media condition. This is accomplished by either reading information prewritten on the media, which indicates the expected thermal interference, or by directly measuring the thermal interference from a calibration sequence recorded when new media is inserted into the disk drive. The direct measurement of thermal interference is performed by first trial writing a specific calibration sequence of marks and gaps on the media. This calibration sequence, called the E(th) sequence, is then read back and the thermal interference value, E(th), is calculated. The specific write and preheat pulse patterns are then adjusted, as a function of the calculated value of E(th), by selecting new sets of write and preheat pulse patterns. The new sets of write and preheat patterns are selected from a look-up table that correlates the correct pattern sets with the measured value of E(th).

19 Claims, 15 Drawing Sheets

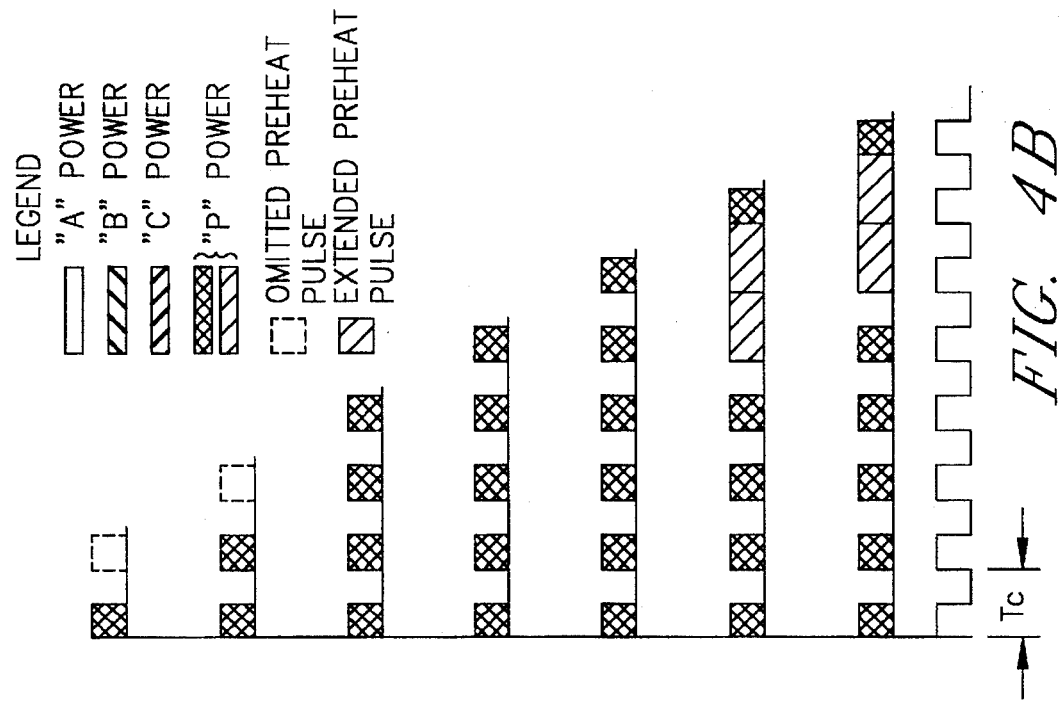
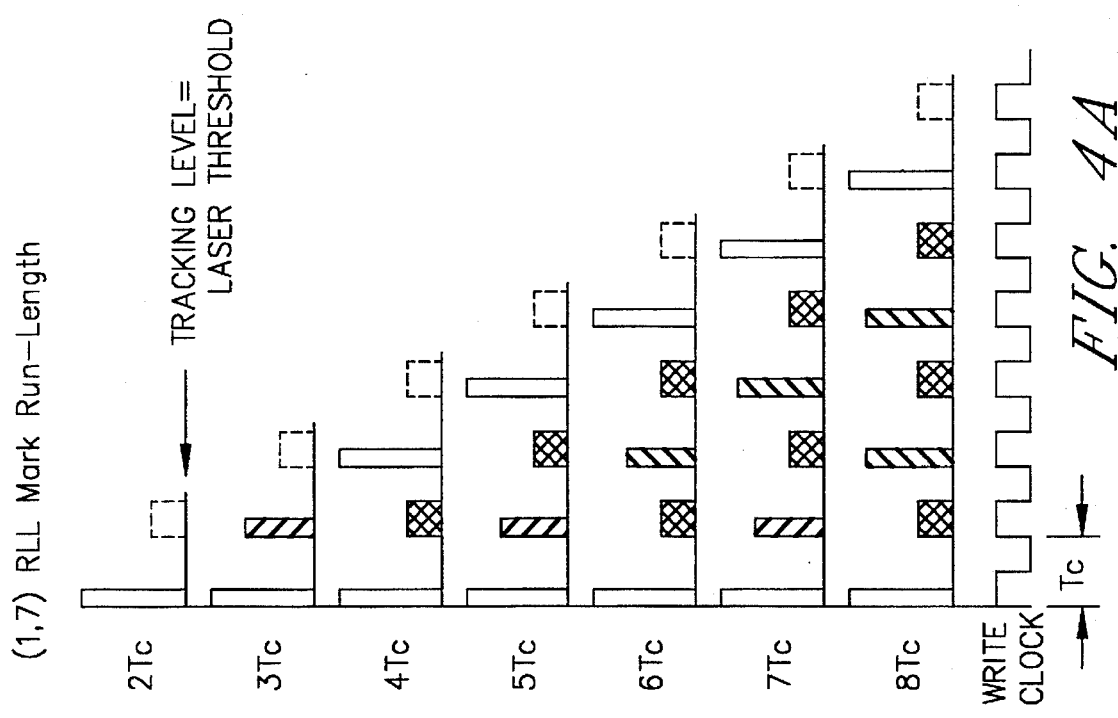
FIG. 4A
FIG. 4B

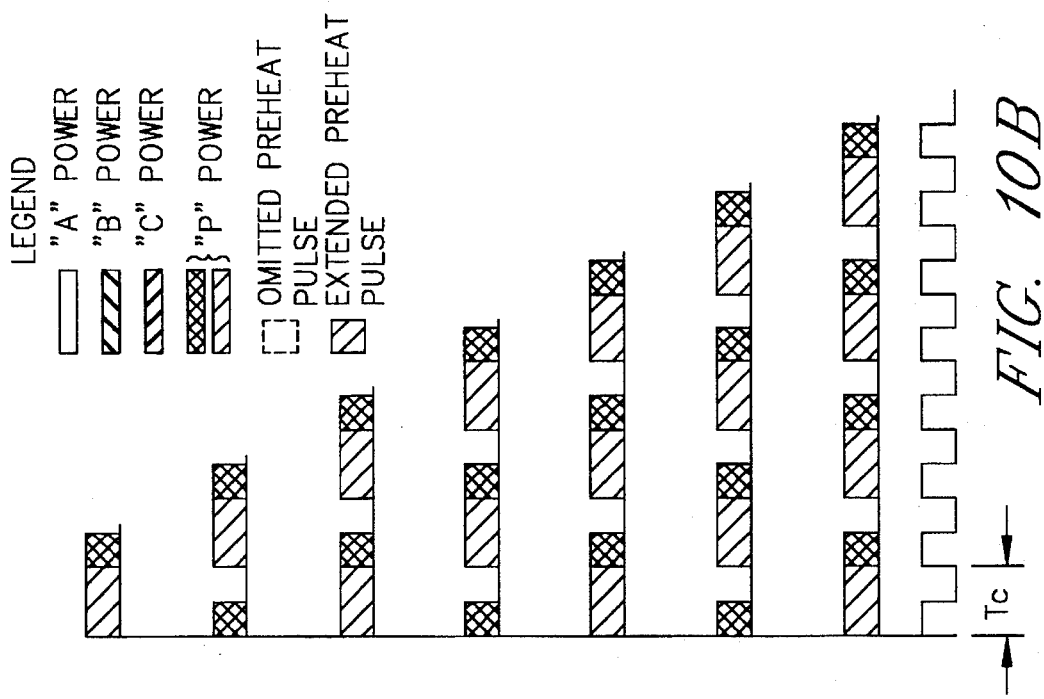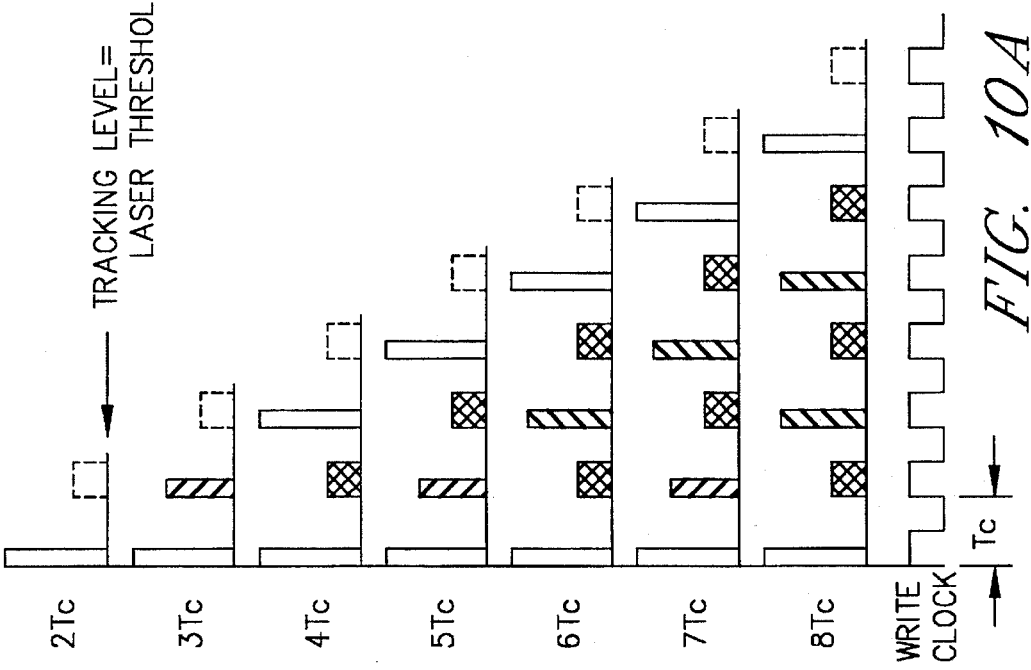
FIG. 10A
FIG. 10B

PULSE WIDTH MODULATION OPTICAL DISK DRIVE WITH ADJUSTABLE PULSED LASER WRITE AND PREHEAT PATTERNS

TECHNICAL FIELD

This invention relates in general to pulse width modulation (PWM) optical disk drives, and in particular to such disk drives that generate preheat pulses in the gaps between PWM marks to allow accurate placement of PWM mark edges.

BACKGROUND OF THE INVENTION

Optical disk drives provide for the storage of great quantities of data on a disk. The data is accessed by focusing a laser beam onto the data layer of the disk and then detecting the reflected light beam.

Magneto-optical (M-O) systems write data by directing a laser to a spot on the data layer to heat it above its Curie temperature while the magnetic domain of the spot is oriented in either an up or a down direction by an external magnetic field. The data is read by directing a low power laser to the data layer. The differences in magnetization direction of the spots cause the plane of polarization of the reflected light beam to be rotated either clockwise or counterclockwise. This change in orientation of polarization of the reflected light is then detected. Magnetic super resolution (MSR) M-O media operates in the same manner as conventional M-O media but uses at least two magnetically coupled magnetic layers and requires a much higher laser power to read the data. Direct overwrite (DOW) M-O media uses at least two magnetically coupled magnetic layers and allows erasure of data and writing of new data to occur in the same disk rotation.

Phase-change systems write data by directing the laser to a spot on the data layer to cause a structural change of the data layer, typically from a crystalline phase to an amorphous phase. The data is detected as changes in reflectivity as the laser beam passes over the different phases. Alloying systems write data by the heating of two chemically distinct materials, such as $Bi_2Te_3$ and $Sb_2Se_3$, to form an amorphous alloy in the data layer. In alloying systems the data is detected as changes in reflectivity. Phase-change media and alloying media are used as write-once read many (WORM) media. Phase-change media are also used as rewriteable media.

In all of these types of systems the writing of data thus occurs due to laser heating of the material in the data layer.

Pulse width modulation (PWM) is one way to write data as marks on optical disks. In PWM, a mark can be either an individual spot (also called a submark) or a series of overlapping or contiguous submarks. PWM records information as the distance between the transitions or edges of the marks. A transition is either the beginning (leading) or end (trailing) edge of a mark. PWM recording is difficult to implement because the mark edges must be precisely positioned and written with sharp boundaries to ensure accurate recording. The thermal buildup that occurs within the data layer in the gaps between the trailing edges and leading edges of adjacent marks during the laser writing process can cause great distortions in the precise placement of the leading edges. Thermal buildup occurs when there is insufficient time between the writing of successive submarks in a mark to allow the data layer to cool prior to the writing of the next mark. Both an increase in disk drive data rate and an increase in linear data density on the disk are causes for the insufficient cooling time. In addition to this problem of thermal preheating caused by thermal buildup, the gap may be so long that there is excessive cooling of the data layer so that the data layer does not reach the required temperature at the precise time to write the submark forming the leading edge of the next mark. In PWM writing the gap lengths also vary so the effect of thermal preheating and cooling on placement of the subsequent mark leading edges depends on the type of mark previously written as well as the length of the gap. Under these conditions of thermal preheating or cooling of the data layer caused by the prior write history, errors occur in the placement of the leading edges of marks. The problem of precise placement of mark edges becomes more significant as the linear density of the submarks increases and the spacing between the submarks decreases because the peak temperature of the thermal interaction in the data layer increases. In addition, each type of optical media has its own thermal characteristics so the problems of thermal preheating and cooling will vary depending on the type of media being used.

IBM's U.S. Pat. No. 5,400,313 describes a PWM optical disk drive that solves these problems by using a modulator-controlled laser to emit the laser beam in a highly pulsed manner. The beam may be pulsed on any given write clock period and at any of several different power levels. The pulsed laser writes essentially circular submarks of substantially the same size on the disk when the power level is sufficiently high. The various PWM mark run-lengths are recorded on the disk either as a single isolated submark in the case of the shortest run-length or as a series of contiguous or overlapping submarks in the case of longer run-lengths. IBM's application Ser. No. 08/342,196, filed Nov. 18, 1994, describes a PWM disk drive where the optical disk is preheated during the intervening PWM gap run-lengths by a series of pulses at a power level below that which would write a submark on the disk. Both the number and duty cycle of these preheat pulses is varied depending on the length of the PWM gap run-length to ensure that the initial submark at the start of the subsequent PWM mark run-length is substantially the same size, regardless of the length of the preceding gap run-length. This ensures proper placement of the mark leading edges. When even finer control of the preheating is required, pattern-dependent gap preheat pulsing can be performed, wherein the number and duty cycle of the preheat pulses in the gap is varied depending not only on the length of the gap run-length but also the length of the preceding mark run-length. Unfortunately, the exact pattern of write and preheat pulses required to optimally position the leading and trailing edges of the marks on the optical disk vary depending on many variables, such as the type of media, the particular media composition and the disk manufacturer.

What is needed is a PWM optical disk drive that reliably writes marks on the disk so that the mark edges are precisely aligned without the adverse effect of thermal preheating or cooling, by adapting the pattern of write pulses for the marks and preheat pulses for the gaps to the particular disk being used.

SUMMARY OF THE INVENTION

The invention is a PWM optical disk drive that can adapt and calibrate its write and preheat pulse patterns to a particular media and media condition by either measuring the thermal interference during recording or by reading information prewritten on the media which indicates the expected thermal interference during recording. The measurement of thermal interference is performed by trial writing a specific calibration sequence of marks and gaps on the media, hereafter referred to as the E(th) sequence, which tests for thermal interference, measuring of the thermal interference term E(th), and adjusting the specific write and preheat pulse patterns through the use of a laser controlled by a programmable modulator. The new sets of write and preheat patterns are selected from a look-up table that correlates the correct pattern sets with the measured value of E(th).

For a fuller understanding of the nature and advantages of the present invention, reference should be made to the following detailed description taken into conjunction with the accompanying drawings.

BRIEF DESCRIPTION OF THE DRAWING

FIGS. 4A and 4B are schematic diagrams illustrating a typical embodiment of the laser beam pulse patterns for each of the mark run-lengths and gap run-lengths, respectively, allowed by the d,k constrained (1,7) RLL code.

FIGS. 10A and 10B are schematic diagrams illustrating a preferred embodiment of the laser beam pulse patterns for each of the mark run-lengths and gap run-lengths, respectively, allowed by the d,k constrained (1,7) RLL code applicable to light modulated DOW optical media.

DESCRIPTION OF THE PREFERRED EMBODIMENTS

Overview of the Optical Disk Drive

Figure 1:
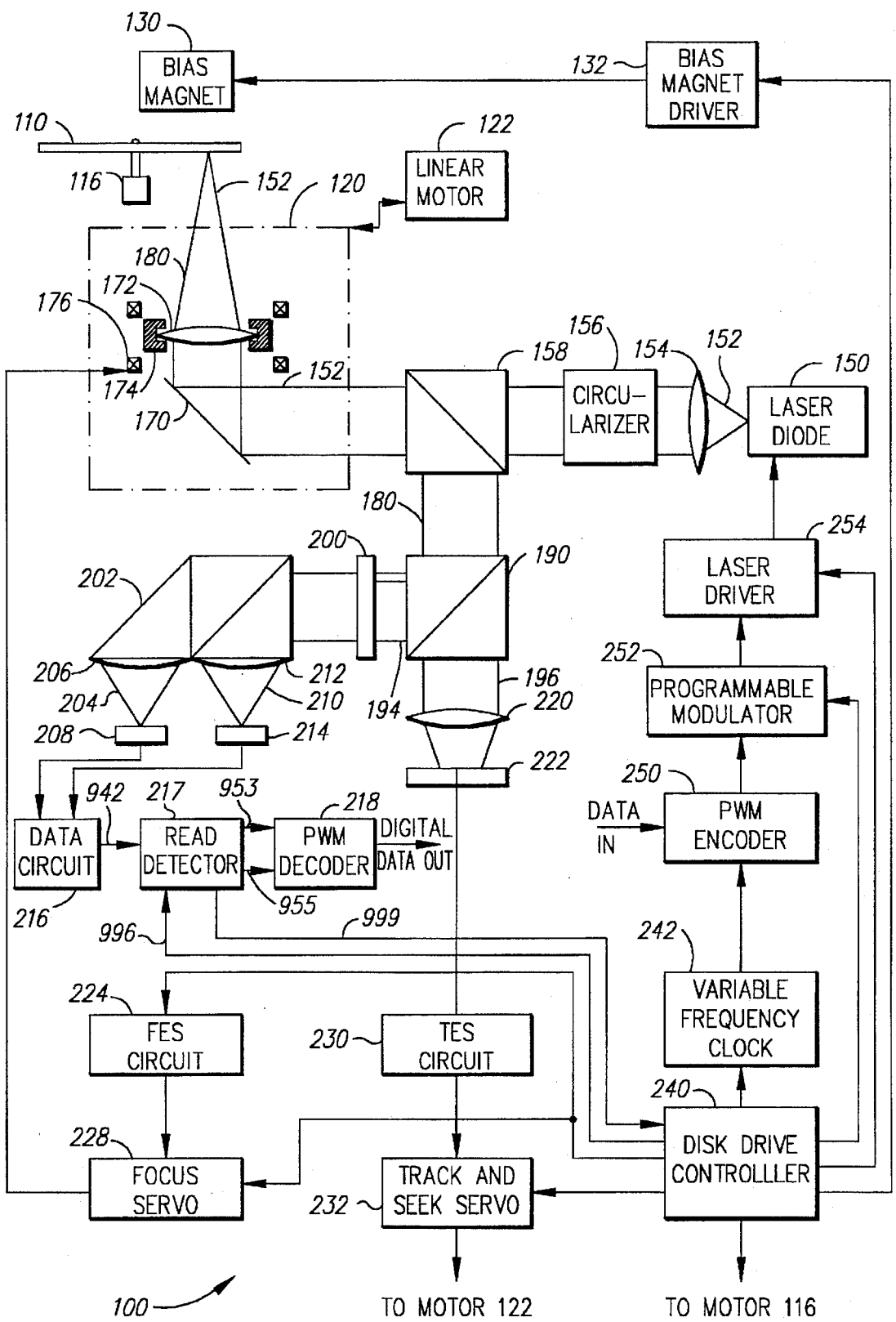
FIG. 1 is a block diagram of the optical disk drive according to the present invention.

A diagram of an optical disk drive according to the present invention is shown in FIG. 1. The disk drive 100 uses an optical disk 110 that contains a thermally responsive data layer and may be a standard M-O disk, an MSR M-O disk, a DOW M-O disk, a WORM disk, or a rewriteable phase-change disk. In the embodiment described with respect to FIG. 1 disk 110 is a standard M-O disk. Disk 110 is mounted to a spindle motor 116. An optical head 120 that directs and focuses a polarized light beam 152 from laser 150 is positioned below disk 110. The beam 152 is focused to a spot on disk 110 on a data track. Head 120 and thus laser beam 152 is movable in a radial direction to different data tracks on disk 110 by a linear motor 122. A bias magnet 130 is located above disk 110 and is connected to a bias magnet driver 132. Bias magnet 130 reorients the magnetic transitions on the M-O data layer on disk 110 when the M-O data layer is heated by the light beam 152.

Laser diode 150 produces a polarized light beam 152. Any type of laser may be used, however, laser 150 is preferably a 685 nm diode laser. Light beam 152 is collimated by a lens 154 and circularized by a circularizer 156, which is preferably a prism.

Beam 152 then passes through a beamsplitter 158 to a mirror 170. Mirror 170 reflects the light beam 152 toward a focusing lens 172. Lens 172 focuses the light beam 152 onto the disk 110. Lens 172 is mounted in a lens holder 174. Holder 174 is movable in the axial direction relative to disk 110 by an actuator motor 176. Mirror 170, lens 172, holder 174 and motor 176 are preferably located in the optical head 120.

As a result of light beam 152 striking the disk 110, a light beam 180 is reflected from disk 110. Reflected light beam 180 passes back through lens 172 and is reflected by mirror 170. A portion of light beam 180 is then reflected by beamsplitter 158 to a second beamsplitter 190. Beamsplitter 190 divides the reflected light beam 180 into a data beam 194 and a servo beam 196.

Data beam 194 passes through a half waveplate 200 to a polarizing beamsplitter 202. Polarizing beamsplitter 202 divides beam 194 into orthogonal polarization components. A first polarization component beam 204 is focused by a lens 206 to a data detector 208 and a second polarization component 210 is focused by a lens 212 to a data optical detector 214. A data circuit 216 is connected to detectors 208 and 214, and generates a pulse width modulation (PWM) data signal representative of the pattern of transitions recorded on disk 110. Data circuit 216 is connected to a read detector 217 that provides an edge detection signal on line 955 and a clock signal on line 933 to a PWM decoder 218. PWM decoder 218 converts the PWM signal to a digital data signal. Read detector 217 is used to read the thermal interference calibration sequences as part of the measurement of E(th) and will be described in detail later with respect to FIG. 16.

Servo beam 196 is focused by a lens 220 onto a segmented optical detector 222, such as a spot size measuring detector as is known in the art. A focus error signal (FES) circuit 224 is connected to detector 222. A focus servo 228, as is known in the art, is connected to FES circuit 224 and motor 176. Servo 228 controls motor 176 to adjust the position of lens 172 as appropriate in order to maintain proper focus. A tracking error signal (TES) circuit 230 is also connected to detector 222. A track and seek servo 232, as is known in the art, is connected to TES circuit 230 and motor 122. Servo 232 causes motor 122 to adjust the position of head 120 and thus light beam 152 radially relative to disk 110.

Figure 2:
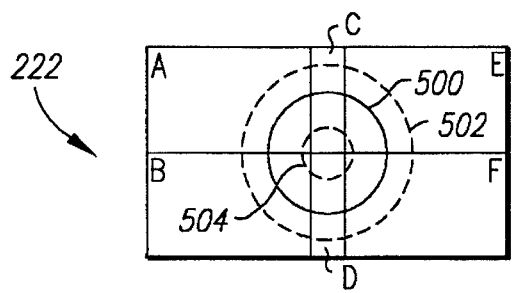
FIG. 2 is a top view of the optical detector shown in FIG. 1 for generating focus, tracking and data signals.

FIG. 2 shows a top view of detector 222. Detector 222 is divided into six sections, 222A, 222B, 222C, 222D, 222E and 222F.

Figure 3:
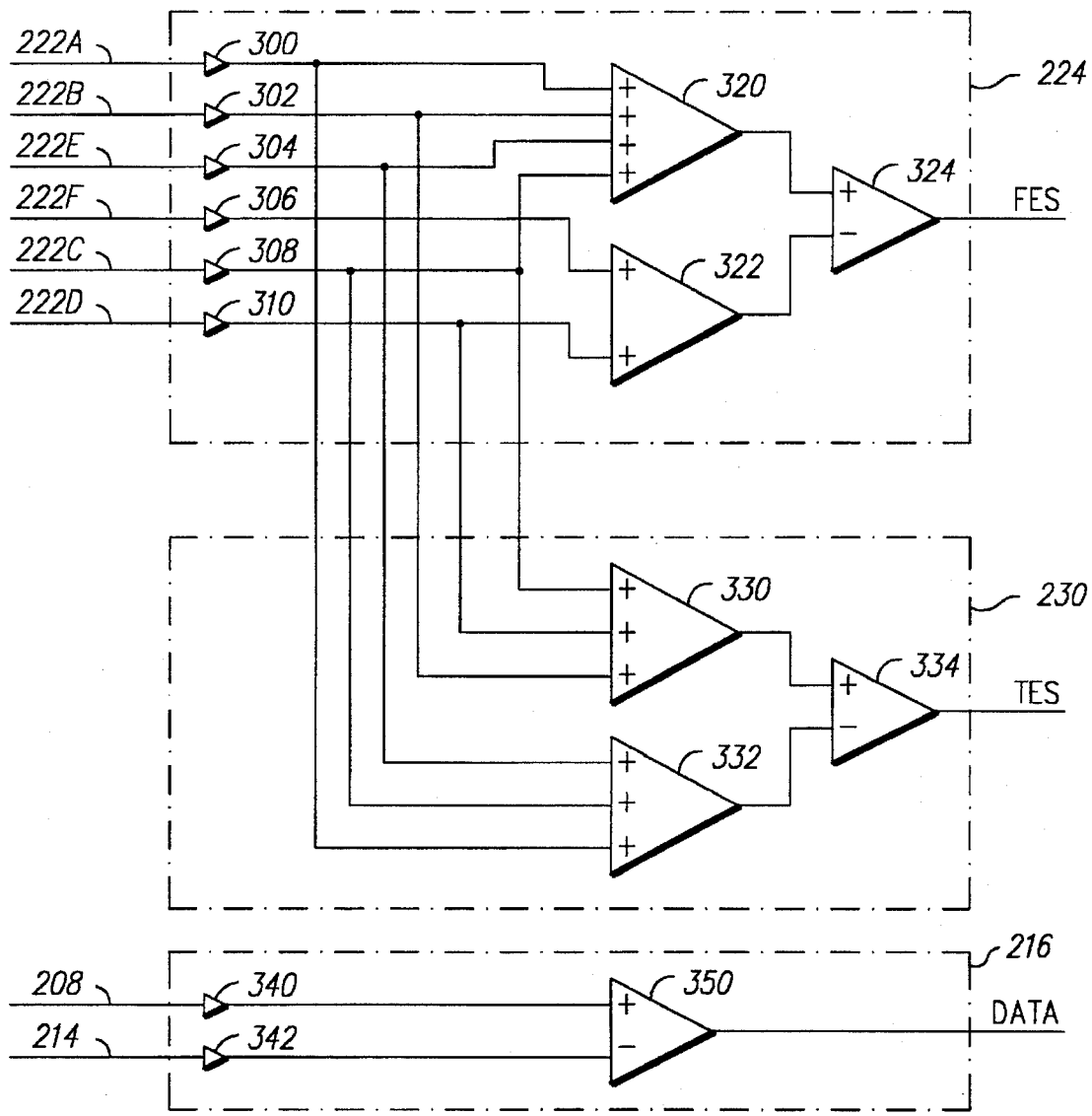
FIG. 3 is a diagram of the circuits for the focus error signal, tracking error signal and data signal.

FIG. 3 shows a circuit diagram of the FES circuit 224, the TES circuit 230, and the data circuit 216.

FES circuit 224 comprises a plurality of amplifiers 300, 302, 304, 306, 308 and 310 connected to detector sections 222A, 222B, 222E, 222F, 222C and 222D, respectively. A summing amplifier 320 is connected to amplifiers 300–306 and a summing amplifier 322 is connected to amplifiers 308 and 310. A differential amplifier 324 is connected to summing amplifiers 320 and 322 and generates the FES.

TES circuit 230 comprises a pair of summing amplifiers 330 and 332, and a differential amplifier 334. Amplifier 330 is connected to amplifiers 302, 306 and 310, and amplifier 332 is connected to amplifiers 300, 304 and 308. Differential amplifier 334 is connected to amplifiers 330 and 332 and generates the TES.

Data circuit 216 includes amplifiers 340 and 342 connected to detectors 208 and 214, respectively. A differential amplifier 350 is connected to amplifiers 340 and 342, and generates the PWM data output signal representative of the marks recorded on the disk 110.

Referring again to FIG. 1, a disk drive controller 240, as is known in the art, is connected to and provides overall control for focus servo 228, track and seek servo 232, spindle motor 116, magnet driver 132, programmable modulator 252, laser driver 254, and a variable frequency clock 242. Controller 240 is typically a dedicated microprocessor coupled to conventional ROM or other semiconductor memory storage that stores the program code instructions. Controller 240 adjusts the clocking speed of the clock 242 as appropriate depending upon the position of head 120. The clock 242 generates timing signals with a characteristic clock cycle time, Tc, and controls the timing of data reading and writing in the disk drive. Variable frequency clock 242, also called a frequency synthesizer, is well known in the art. The spindle motor 116 is controlled to spin at a constant angular velocity and the linear velocity of light beam 152 relative to disk 110 will vary depending upon the radial position of head 120.

Clock 242 is connected to a PWM encoder 250. Encoder 250 receives a digital data signal from the host computer and encodes it into the desired PWM code. In the preferred embodiment, encoder 250 is a (1,7) run-length limited (RLL) PWM encoder. PWM encoders are well known in the art and implement a variety of PWM codes. An example of a (1,7) encoder is described in IBM's U.S. Pat. No. 4,488, 142 and an example of a (2,7) encoder is described in IBM's U.S. Pat. No. 3,689,899. Encoder 250 is connected to a modulator 252. Modulator 252 receives the PWM code and causes the laser 150, via the laser driver 254, to write the desired data patterns onto the data layer of disk 110.

The operation of disk drive 100 will now be explained. During the write operation the encoder 250, with its timing controlled by clock cycles from clock 242, encodes the digital data from the host computer into a PWM (1,7) RLL encoded digital data signal. This encoded data signal is sent to the modulator 252 which converts it into instructions to the laser driver 254 for writing the desired pulsed pattern according to the present invention. The laser 150 is pulsed (from threshold level to the higher write levels) responsive to the laser driver 254 and provides a pulsed light beam 152 at the desired power levels. Beam 152 is powerful enough to heat the data layer of disk 110 to above its Curie temperature. At this temperature, the data layer of disk 110 may be magnetically aligned in either an up or down direction. Disk 110 is initially magnetically aligned in a first direction. Controller 240 causes magnet control 132 to energize magnet 130 in the opposite direction to that of the disk. The desired data pattern is then recorded on the disk as changes in magnetic domain orientations.

As shown in FIG. 2, when beam 152 is exactly focused on disk 110, servo beam 196 will have a circular cross section 500 on detector 222. The sum of the amount of light hitting areas C and D will be approximately equal to the sum of the amount of light hitting areas A, B, E and F, which will cause FES circuit 224 to generate a zero FES. If beam 152 is slightly out of focus one way or the other, beam 196 will have a circular cross section 502 or 504 on detector 222. This change in circular cross section causes circuit 224 to generate a positive or negative FES. The FES is used by the focus servo 228 (FIG. 1) to control motor 176 to move lens 172 until focus is again achieved.

If beam 152 is focused exactly on a track of disk 110, then servo beam 196 will fall as a circular cross section 500 equally between the sections A, C and E, and the sections B, D and F. If beam 152 is off track, beam 196 will fall more on sections A, C and E, and less on sections B, D and F, or vice versa. This will result in a positive or negative TES being produced by TES circuit 230. This TES is then used by the track and seek servo 232 (FIG. 1) to control motor 122 to adjust head 120 radially on disk 110 until the beam 152 is once again on track.

During a read operation, controller 240 causes laser driver 254 to energize laser 150 to generate the low power read level beam 152. Beam 152 hits disk 110. The low power beam does not heat disk 110 to above its Curie temperature. The reflected light 180 has its plane of polarization rotated one way or the other depending upon the magnetic domain orientations of the spots on the disk 110. These differences in polarization are detected by detectors 208 and 214, and data circuit 216 outputs a PWM data signal to PWM decoder 218 that converts the signal back to a digital data signal.

PWM RLL Encoding Data Patterns with Pulsed Preheating

PWM recording uses the distance between transitions of recorded runs to encode digital data. The length between transitions contains the information of the digital data. There are many different encoding schemes known in the art which may be used to encode digital data into PWM marks and gaps. The most popular type of encoding schemes use run-length limited (RLL) codes. These RLL codes use a small set of run-lengths, which when used in different combinations, encode any pattern of digital data. A run-length is defined as either a) the distance between the leading edge of a mark, or series of connecting submarks, and the trailing edge of the mark (i.e., the mark "run-length"), or b) the distance between the trailing edge of a mark run-length and the leading edge of the subsequent mark run-length (i.e., the gap run-length). RLL codes are defined in units of code clock cycles Tc. In disk drive systems this time period Tc corresponds to the code bit length, Lc, which is the linear distance the disk rotates in the time period Tc. The RLL codes are designated in the form (d, k), where d+1 is the minimum run-length (in time periods Tc) and k+1 is the maximum run-length (in time periods Tc). For example, a (d,k) constrained (1,7) RLL code has a minimum run-length of 2 Tc and a maximum run-length of 8 Tc. In the application of PWM recording to optical recording disk drives, the mark run-lengths are formed by local heating of the disk resulting from absorption of laser radiation. The gap run-lengths correspond to the spaces or gaps between successive mark run-lengths.

Figure 5:
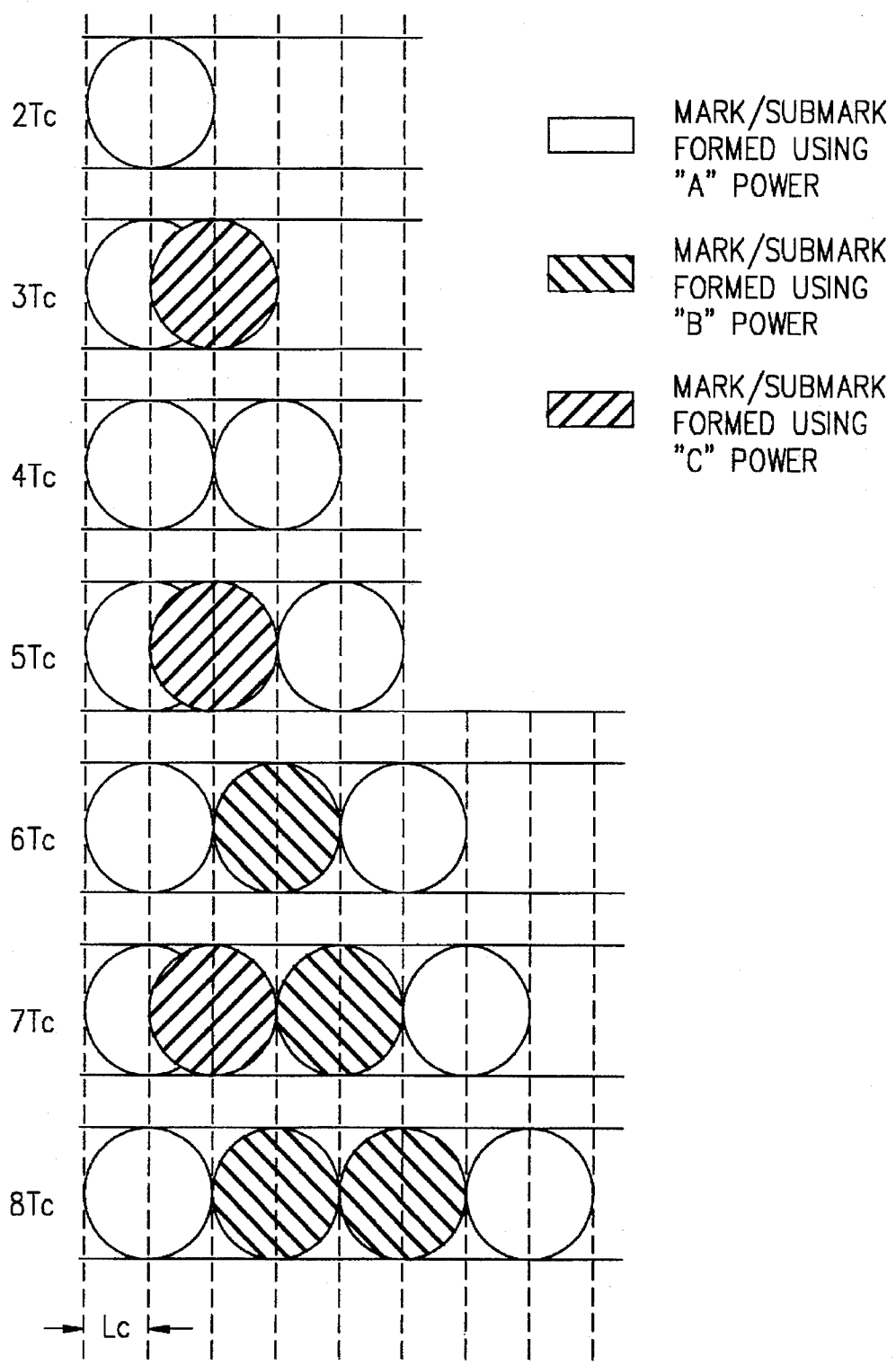
FIG. 5 is a schematic diagram illustrating the (1,7) mark run-lengths generated when the laser is pulsed as in FIG. 4A.

The technique of accurately forming leading and trailing edge submarks is called edge writing and a complete description of the laser pulsing pattern (laser irradiation profile) required to generate all the mark and gap run-lengths required by a particular code is called an edge writing algorithm for that particular code. For example, FIGS. 4A and 4B illustrate an edge writing algorithm for a (1,7) RLL code. The written patterns, as shown in FIG. 5, use the absolute minimum number of circular marks to write the desired mark run-lengths. Where the submarks must overlap by Lc, as in the 5 Tc mark run-length, the second submark is written at a reduced power level. Where there are three or more submarks, and an overlap must occur, as in the 7 Tc mark run-length, the overlap does not occur on the trailing edge circular submark. This helps ensure that the trailing edge, which is most susceptible to the thermal buildup, will be accurately positioned. As a special case the 3 Tc mark run-length, which is comprised of two circular submarks, utilizes a special power level C to ensure that this mark run-length is accurately written.

FIGS. 4A–4B show a schematic diagram of the set of recording patterns (laser irradiation profile) that implements a (1,7) RLL code and that uses preheat pulses between writing pulses and during the gap run-lengths. This profile is intended for use in standard M-O recording systems but is extendable with minor modifications to other optical recording systems such as those that use WORM, rewriteable phase-change media, DOW M-O and MSR media. The code is a set of mark run-lengths (FIG. 4A) and gap run-lengths (FIG. 4B) of 2 Tc to 8 Tc. The laser can be pulsed to any of four discrete power levels above the threshold level (these power levels are designated as A, B, C, and P in FIGS. 4A–4B), where $A \geq B \geq C > P$. When the laser is not at the A, B, C, or P power level, it is operating at a "tracking" power level which is as low as possible. In the preferred embodiment the laser current during this time is equal to the threshold current for lasing and the laser power is less than 0.5 mW. Laser pulses at power levels A, B, and C are of sufficient intensity to produce substantially circular marks in the optical disk during laser irradiation and as such are referred to as writing pulses. Laser pulses at power level P are not of surf dent intensity to produce marks in the optical disk and as such are referred to as preheat pulses since they serve only to locally heat the disk. In optical disk drives, the time duration of the writing pulse is as short as possible and typically around 10–20 ns. It is usually selected to be between approximately 30% of Tc at the disk innermost track and 60% of Tc at the disk outermost track. In the preferred embodiment Tc=35 ns at the disk innermost track and Tc=17.5 ns at the disk outermost track. Both the number and duty cycle of the preheat pulses is variable. The duty cycle spans the range between 0% and 100% of Tc. In the preferred embodiment the P pulse width is selectable among discrete values of 0%, 50%, and 100% of Tc to simplify the circuitry needed to modulate the laser. These discrete values of P pulse width provide sufficient flexibility in preheat to ensure adequate edge placement regardless of the particular gap run-length.

As shown in FIG. 4A for the case of a (1,7) RLL code, mark run-lengths are formed by either an isolated A laser pulse in the case of a 2 Tc mark run-length or the combination of an A laser pulse with A, B, C, and/or P pulses in the case of longer mark run-lengths. The submark patterns for mark run-lengths generated on the optical disk by the laser pulse profiles shown in FIG. 4A is shown in FIG. 5. The laser power level A is adjusted so that the 2 Tc mark is the correct length. As is known in conventional disk drives, this is done during the drive's laser power calibration routine by writing a predetermined data sequence and then measuring the read-back signal amplitude by one of several known techniques. The calibration is typically performed at disk drive start-up and/or at periodic intervals during drive operation.

Mark run-lengths>2 Tc require at least two laser pulses: an A laser pulse to form the leading edge submark and either a C pulse (in the case of the 3 Tc mark run-length) or an A pulse (in the case of mark run-lengths greater than 4 Tc) to form the trailing edge submark. The power level C is adjusted so that the 3 Tc mark is the correct length. This C pulse is required because thermal preheating of the optical disk by the preceding A pulse would otherwise cause the trailing edge submark of the 3 Tc mark run-length to be positioned beyond its desired precise location on the disk. The pulses used to write leading and trailing edge submarks are called "edge" writing pulses. Each of the edge writing pulses forms a substantially circular submark of length 2 Lc on the optical disk. Whenever the mark run-length is greater than 4 Tc (i.e., the length of two contiguous submarks formed by successive leading and trailing edge writing pulses), additional write pulses are required. These additional pulses are called "filler" writing pulses because they are used to write filler submarks connecting the leading and trailing edge submarks. When the difference between the particular mark run-length (mark run-lengths are designated in integral numbers of clocks as mTc where m is an integer) and 4 Tc is an odd number of code clocks, i.e., whenever (m–4) is odd and m>4, then a C filler pulse is used to form a submark that overlaps the leading edge submark by Lc. This is shown for the 5 Tc and 7 Tc mark run-lengths in FIG. 5. In addition, when (m–4) is even and m>4, (m–4)/2 B filler pulse(s) are used to form contiguous submarks contiguous with the leading and trailing edge submarks. This is shown for the 6 Tc and 8 Tc mark run-lengths in FIG. 5. The power level B is adjusted so that the 8 Tc mark is the correct length. This B pulse is required because thermal preheating of the optical disk by a series of preceding filler pulses would otherwise cause the trailing edge submark of the 8 Tc mark run-length to be positioned beyond its desired precise location on the disk. Finally, when m>4 both the trailing edge pulse and any B level filler pulses are immediately preceded by a P preheat pulse of duration 0.5 Tc. This is shown in FIG. 4A.

The preheat pulses shown in FIGS. 4A–4B serve two purposes. First, when writing mark run-lengths (FIG. 4A) they increase the ambient temperature of the optical disk, which reduces the power required in the A, B, and C writing pulses. This is accomplished by applying preheat pulses on all write clocks which do not have a writing pulse, i.e., during all clocks of a gap run-length and during clocks of a mark run-length which do not have an A, B, or C writing pulse. In the art prior to IBM's previously cited related application, a continuous low level laser power is applied to the media at a laser power level called the tracking level, which is typically 1.5 mW. In the present invention, the laser power is applied only on clocks where no writing pulse occurs and then as discrete preheat pulses of length 0.5 Tc at the P power level, which is set at the minimum level required to provide adequate preheating, i.e., approximately 2 mW.

The second purpose served by the preheat pulses is that during the gap run-lengths (FIG. 4B) they control the ambient temperature of the optical disk during the subsequent leading edge writing pulse of a mark run-length. This control is required to compensate for the effect of preheating of the optical disk by the immediately preceding trailing edge writing pulse. This is accomplished by varying the amount of preheat (duty cycle of the preheat pulses) applied in each gap run-length as shown in FIG. 4B. First, preheat pulses are omitted during the last write clock in all mark run-lengths (see dashed "pulses" representing omitted preheat pulses in FIG. 4A). This allows the optical disk to rapidly cool after the trailing edge writing pulse. Second, as shown in FIG. 4B, preheat pulses are either omitted (0% duty cycle) as in the case of 2 Tc and 3 Tc gap run-lengths or extended (100% duty cycle) as in the case of 7 Tc and 8 Tc gap run-lengths. This ability to vary the duty cycle of the preheat pulses allows tailoring of the preheating to each gap run-length to ensure that the subsequent leading edge writing pulse forms the leading edge submark at the proper precise position on the optical disk. The specific set of preheat pulse patterns shown in FIGS. 4A–4B represent patterns that are appropriate for most current M-O media. The exact number and placement of added or deleted preheat pulses is adjusted for a particular media to ensure accurate mark and gap run-lengths. Examples of extending this procedure to other media types will be shown and explained in FIGS. 8A–8B and 9 for WORM media and in FIGS. 10A–10B and 11 for DOW M-O media. The pulse writing and preheat scheme depicted in FIGS. 4A and 4B is summarized in Table 1 below, which shows the set of write patterns for the mark run-lengths and the set of preheat patterns for the gap run-lengths.

TABLE 1

Laser Pulse Patterns for FIGS. 4A and 4B

| Run Length | Laser Pulse Patterns | |
|---|---|---|
| | Mark | Gap |
| 2 T | AT | PT |
| 3 T | ACT | PPT |
| 4 T | APAT | PPPP |
| 5 T | ACPAT | PPPPP |
| 6 T | APBPAT | PPPPPP |
| 7 T | ACPBPAT | PPPPEEP |
| 8 T | APBPBPAT | PPPPPEEP |

In Table 1, A, B, and C represent write pulses at their respective power levels, T represents a preheat pulse with 0% duty factor (i.e., no preheat pulse), P represents a preheat pulse with 50% duty factor, and, E represents a preheat pulse with a 100% duty factor (i.e., an "extended" preheat pulse). While in the preheat pulsing example as described and shown in FIG. 4B, there is only one preheat pulsing pattern for each gap run-length, it may also be desirable to provide multiple preheat pulsing patterns for each gap run-length, where the specific pattern is selected based on the run-length of the mark just preceding the gap. This is because each mark run-length (such as those shown in FIG. 4A) may result in a slightly different temperature in the media immediately following the writing of the last submark in the mark. With this type of gap preheat pulsing, dependent on the specific pattern preceding the gap, the location of the leading edge of the next mark can be further optimized.

Figure 6B:
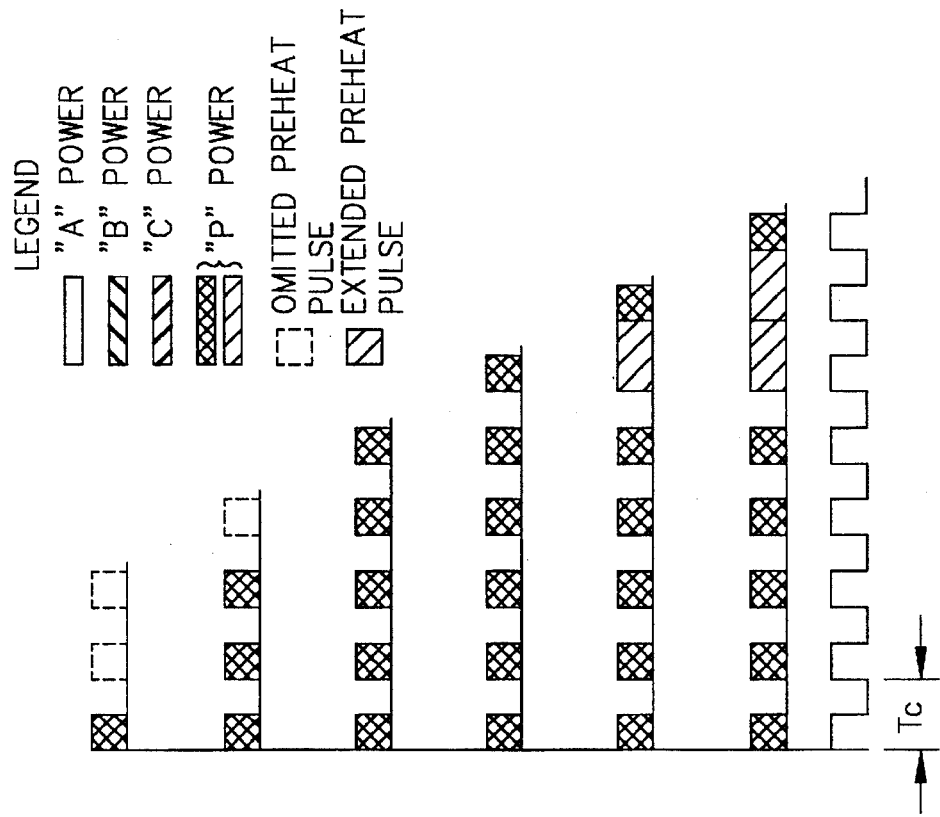
FIGS. 6A and 6B are schematic diagrams illustrating a preferred embodiment of the laser beam pulse patterns for each of the mark run-lengths and gap run-lengths, respectively, allowed by the d,k constrained (2,7) RLL code.
Figure 6A:
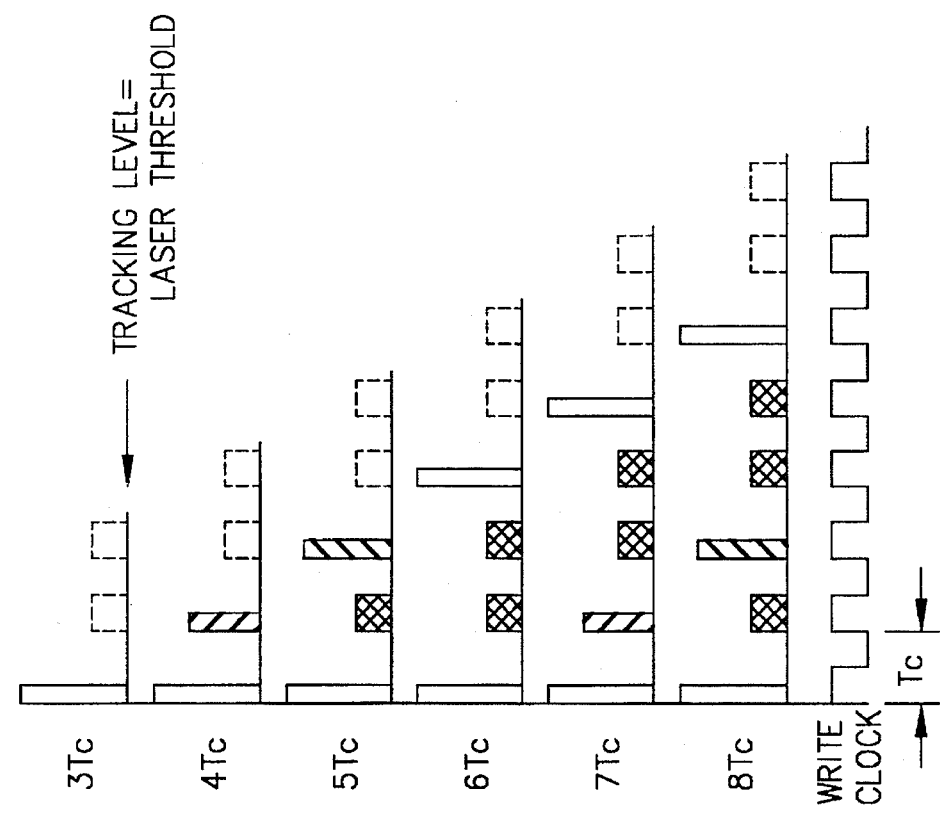

As explained above, a (1,7) RLL code is used and only the 2 Tc–8 Tc run-lengths are needed. However, any number of (d,k) RLL codes can be used. For example, FIGS. 6A–6B show a schematic diagram of the recording pattern (laser irradiation profile) of the present invention that implements a (2,7) RLL code. This profile is intended for use in standard M-O recording systems but is extendable with minor modifications to other optical recording systems such as those that use WORM, DOW M-O and MSR media. The code is a set of mark run-lengths (FIG. 6A) and gap run-lengths (FIG. 6B) of 3 Tc to 8 Tc. The laser can be pulsed to any of four discrete power levels above the threshold level (these power levels are designated as A, B, C, and P in FIGS. 6A–6B), where A≧B≧C>P.

Figure 7:
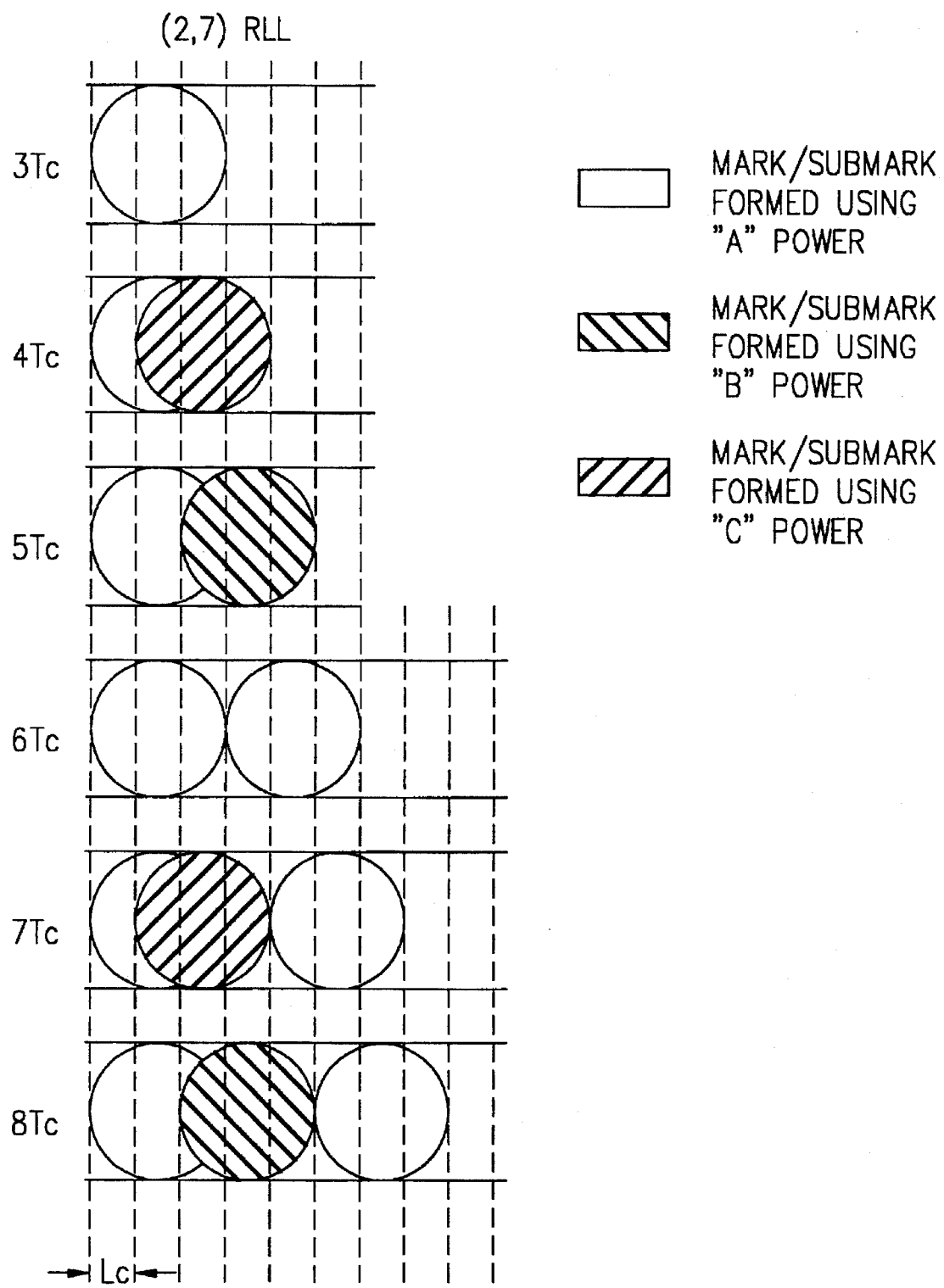
FIG. 7 is a schematic diagram illustrating the (2,7) mark run-lengths generated when the laser is pulsed as in FIG. 6A.

As shown in FIGS. 6A–6B for the case of a (2,7) RLL code, mark run-lengths are formed by either an isolated A laser pulse in the case of a 3 Tc mark run-length or the combination of an A laser pulse with A, B, C, and/or P pulses in the case of longer mark run-lengths. The submark patterns for mark run-lengths generated on the optical disk by the laser pulse profile in FIG. 6A is shown in FIG. 7. The power level A is adjusted so that the 3 Tc mark is the correct length. Mark run-lengths >3 Tc require at least two laser pulses: an A laser pulse to form the leading edge submark and either a C pulse (in the case of the 4 Tc mark run-length), a B pulse (in the case of the 5 Tc mark run-length), or an A pulse (in the case of mark run-lengths >6 Tc) to form the trailing edge submark. The power level C is adjusted so that the 4 Tc mark is the correct length and the power level B is adjusted so that the 5 Tc mark is the correct length. These B and C pulses are required because thermal preheating of the optical disk by the preceding A pulse would otherwise cause the trailing edge submark of the 4 Tc and 5 Tc mark run-lengths, respectively, to be positioned beyond their desired precise location on the disk. Each of these edge writing pulses forms a substantially circular submark of length 3 Lc on the optical disk. Whenever the mark run-length is greater than 6 Tc (i.e., the length of two contiguous submarks formed by successive leading and trailing edge writing pulses), additional write pulses are required. When the difference between the particular mark run-length and 4 Tc is a multiple of 3 clocks, i.e., (m−4)/3=n where m>4 and n is an integer, then a C writing pulse is used to form a submark that overlaps the leading edge submark by 2 Lc, as shown for the 4 Tc and 7 Tc mark run-lengths in FIG. 7. In addition, when (m−5) is multiple of 3, i.e., (m−5)/3=n where m>5 and n is an integer, then a B writing pulse is used to form a submark that overlaps the leading edge submark by Lc, as shown for the 5 Tc and 8 Tc mark run-lengths in FIG. 7. Finally, when m≧5, A trailing edge writing pulses are immediately preceded by two P preheat pulses of duration 0.5 Tc (6 Tc, 7 Tc and 8 Tc mark run-lengths in FIG. 6A) and B writing pulses are immediately preceded by one P preheat pulse of duration 0.5 Tc (8 Tc mark run-length in FIG. 6A). The pulse writing and preheat scheme depicted in FIGS. 6A and 6B is summarized in Table 2 below.

TABLE 2

Laser Pulse Patterns for FIGS. 6A and 6B

| Run Length | Laser Pulse Patterns | |
|---|---|---|
| | Mark | Gap |
| 3 T | ATT | PTT |
| 4 T | ACTT | PPPT |
| 5 T | APBTT | PPPPP |
| 6 T | APPATT | PPPPPP |
| 7 T | ACPPATT | PPPPPEP |
| 8 T | APBPPATT | PPPPPEEP |

The set of preheat pulse patterns shown in FIGS. 6A–6B serve the same purposes described above. Gap run-length dependent preheating is accomplished by varying the amount of preheat (duty cycle of the preheat pulses) applied in each gap run-length, as shown in FIG. 6B. First, preheat pulses are omitted during the last two write clocks in all mark run-lengths which permits the optical disk to rapidly cool after the trailing edge writing pulse. Second, as shown in FIG. 6B, preheat pulses are either omitted (0% duty cycle) as in the case of 3 Tc and 4 Tc gap run-lengths or extended (100% duty cycle) as in the case of 7 Tc and 8 Tc gap run-lengths. This permits tailoring of the preheat to each gap run-length to ensure that the subsequent leading edge writing pulse forms the correct leading edge submark at the proper precise position on the optical disk.

Figure 8B:
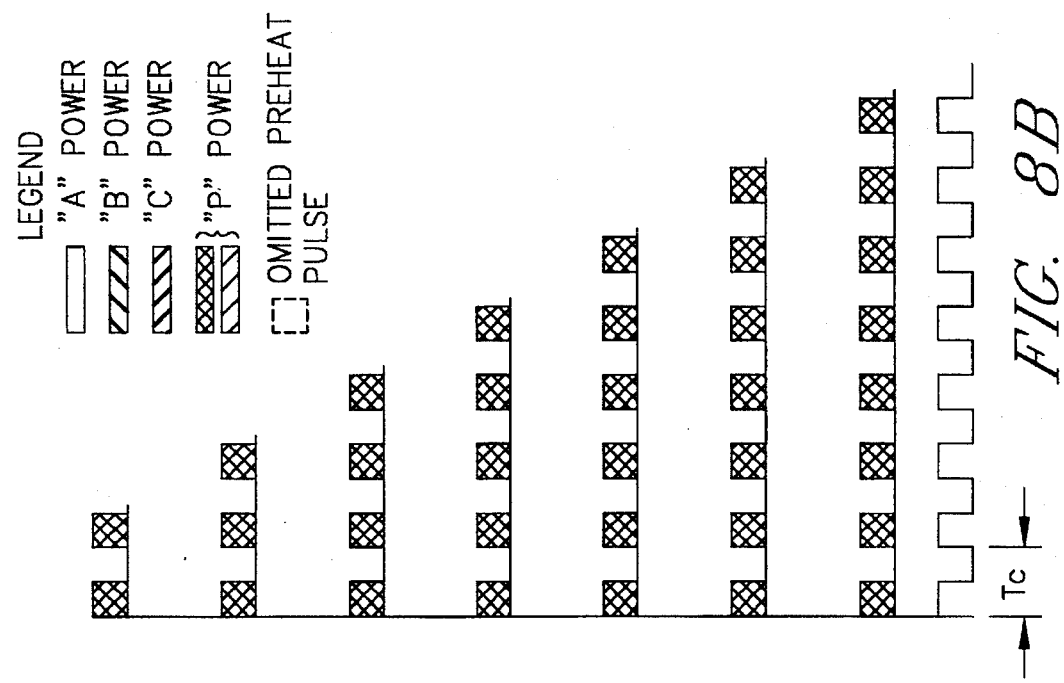
FIGS. 8A and 8B are schematic diagrams illustrating a preferred embodiment of the laser beam pulse patterns for each of the mark run-lengths and gap run-lengths, respectively, allowed by the d,k constrained (1,7) RLL code applicable to slow-cooling WORM optical media.
Figure 8A:
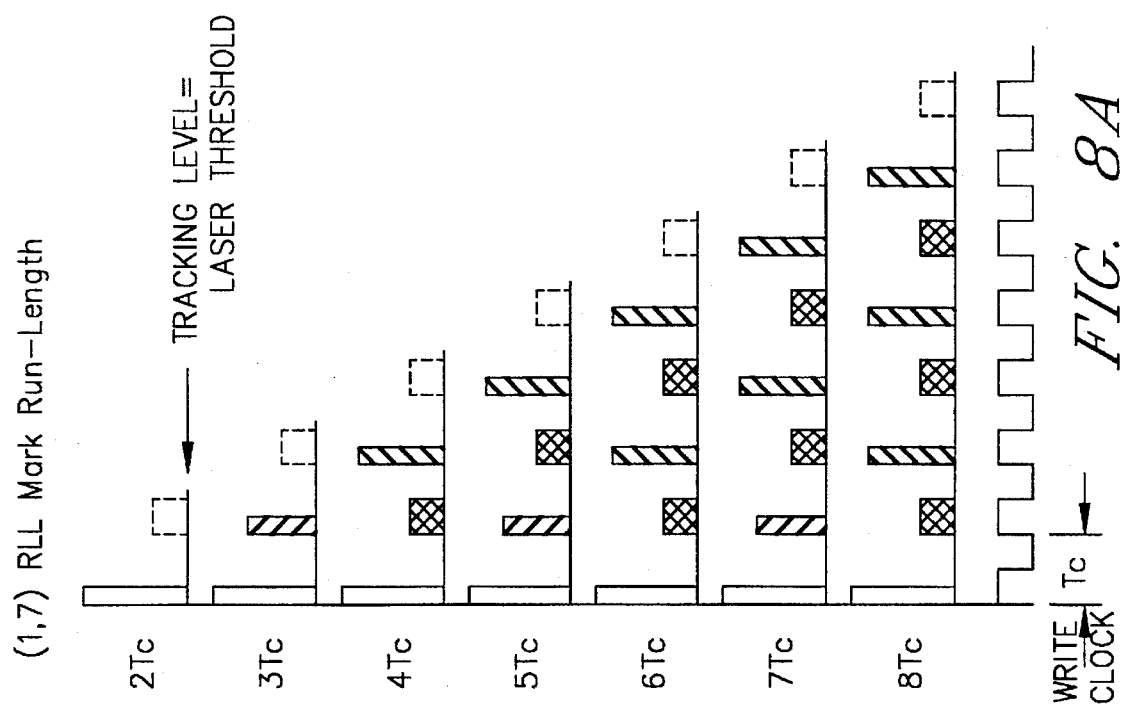
Figure 9:
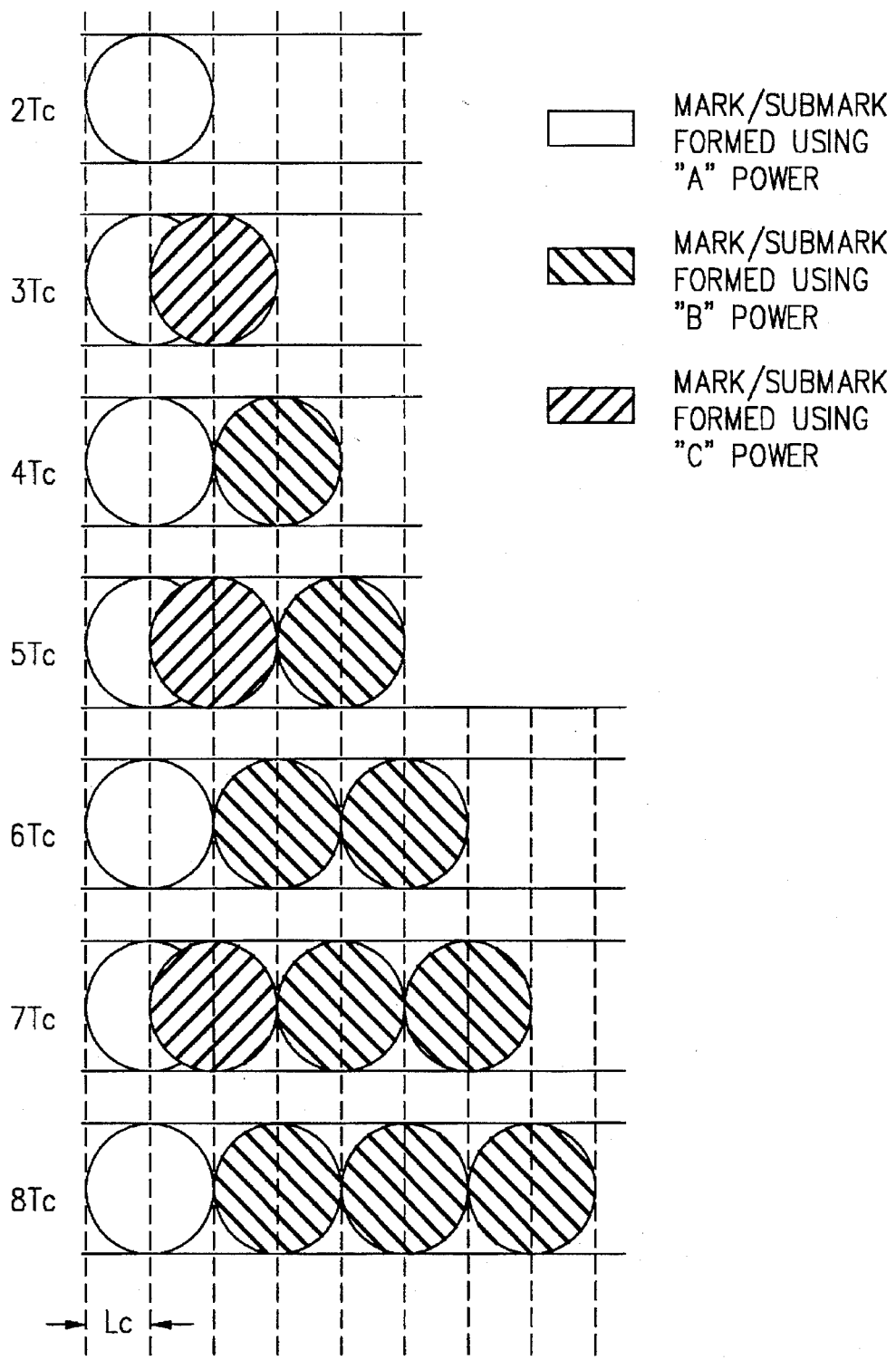
FIG. 9 is a schematic diagram illustrating the (1,7) mark run-lengths generated when the laser is pulsed as in FIG. 8A.

FIGS. 8A–8B and 9 illustrate a (1,7) RLL edge writing algorithm and the resulting sets of patterns applicable to a phase-change type WORM optical disk. This disk can be characterized by strong short range thermal interactions between adjacent submarks. This is shown in FIG. 8A for the 3 Tc mark where the A power level pulse is followed immediately by a C power level pulse. Thus the C power level for this disk is significantly less than the C power level for the M-O disk. The phase-change WORM disk is also characterized by very little thermal interaction in the gaps between marks. Hence, the P preheat pulses in the mark run-lengths are used only to reduce the power levels required for the writing pulses; i.e., the A, B, and C power levels. A filler writing pulse at the C power level is used on the second clock of all odd mark run-lengths to compensate for the strong short range thermal interaction with the leading edge writing pulse of the odd mark run-lengths. The C power level is chosen such that the 3 Tc mark run-length is written correctly. Likewise, because there is very little thermal interaction, a B pulse is used for all filler and trailing edge writing pulses for mark run-lengths greater than 3 Tc. The B power level is a 2 Tc extension pulse because it extends the length of any prior mark by 2 Tc when written contiguously with the preceding writing pulse. The B power level is chosen such that the 8 Tc mark run-length is written correctly. As in the case of FIG. 4A, the final preheat pulse of every mark run-length is omitted to permit rapid cooling of the trailing edge writing pulse. Finally, as shown in FIG. 8B, the reduced thermal interaction allows for a 50% of Tc duty cycle preheat pulse during every clock of all gap run-lengths. The pulse writing scheme depicted in FIGS. 8A and 8B is summarized below.

TABLE 3

| Laser Pulse Patterns for FIGS. 8A and 8B | | |
|---|---|---|
| Run Length | Laser Pulse Patterns | |
| | Mark | Gap |
| 2 T | AT | PP |
| 3 T | ACT | PPP |
| 4 T | APBT | PPPP |
| 5 T | ACPBT | PPPPP |
| 6 T | APBPBT | PPPPPP |
| 7 T | ACPBPBT | PPPPPPP |
| 8 T | APBPBPBPT | PPPPPPPP |

Figure 11:
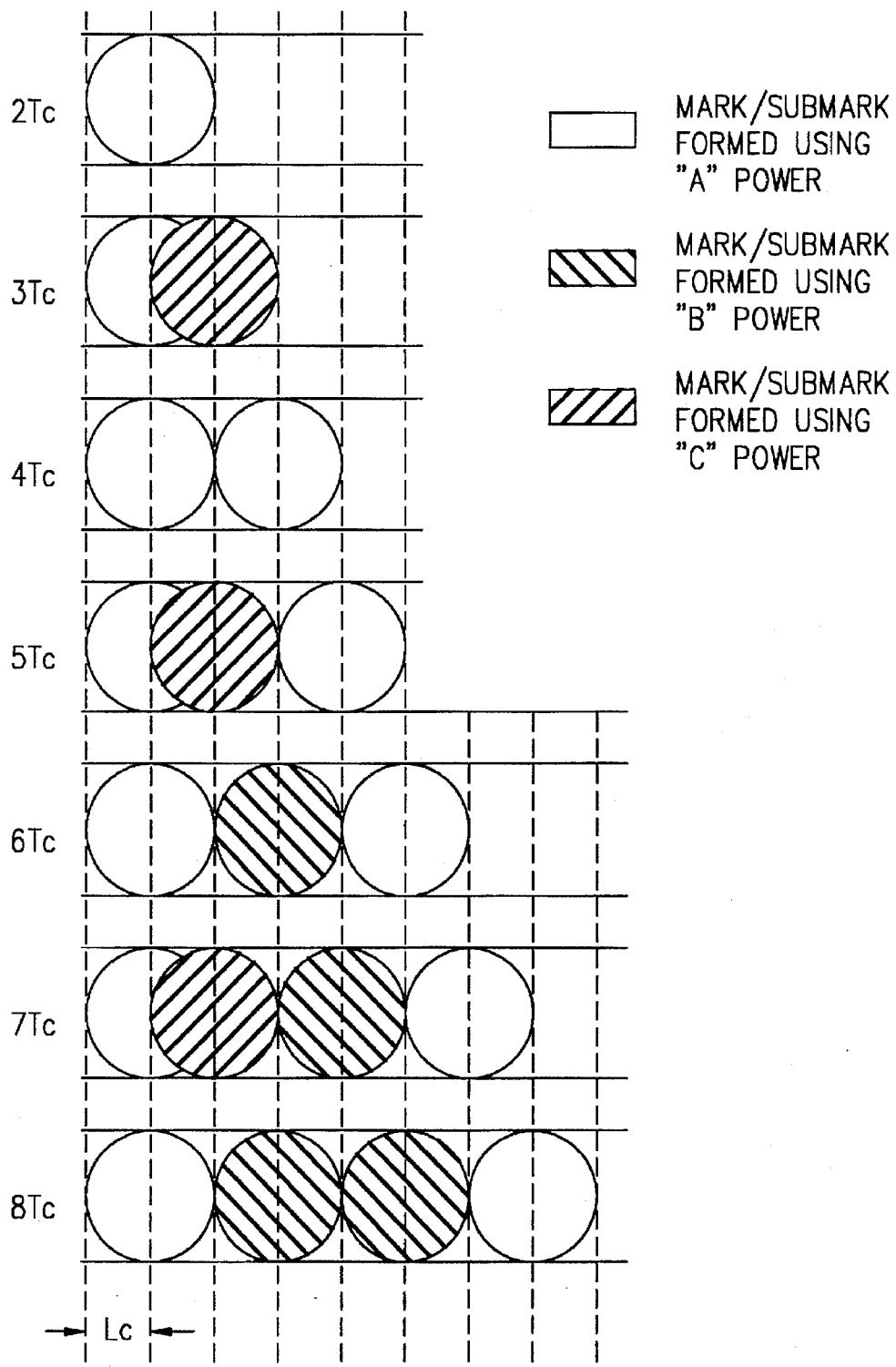
FIG. 11 is a schematic diagram illustrating the (1,7) mark run-lengths generated when the laser is pulsed as in FIG. 10A.

FIGS. 10A–10B and 11 illustrate a (1,7) RLL edge writing algorithm and the resulting sets of patterns on the optical media applicable to a light modulated DOW M-O type optical disk. During overwriting, this disk requires that the minimum media temperature of the data layer be high enough to ensure adequate erasure of previous data. Hence the P power level is selected to be considerably higher than that for the other types of optical media. To accomplish this, both the P power level and the duty cycle of the preheat pulses in the gap run-lengths are increased. As shown in FIG. 10B, during the final two clocks of all gap run-lengths the laser is pulsed at 100% and 50% of Tc, respectively. This pulse pattern is identical to the 2 Tc gap run-length pattern. The 50% of Tc preheat pulse is used to control the cooling of the disk prior to the leading edge writing pulse, thereby increasing the thermal gradient and improving the writing of the leading edge mark/submark of the following mark run-length. Gap run-lengths greater than 2 Tc require additional preheat pulses. For even gap run-lengths the preheat patterns are repeating blocks of the 2 Tc gap run-length pattern. For odd gap run-lengths the first clock of the run-length is a 50% of Tc preheat pulse followed by the correct number of 2 Tc gap run-length pattern preheat pulses. This leaves periodic cooling times of 0.5 Tc in the gap run-lengths which limits the thermal buildup in the gaps. This limits side erasure and improves laser power margins by limiting the temperature excursion of the media during the gap run-lengths while still ensuring adequate on-track erasure. The process of serration by pulsed preheating causes the media temperature to oscillate between an upper and lower temperature during the gap run-length. By comparison, where there is no pulsed preheating in the gaps but rather an essentially constant preheat power level until just before writing the next mark (i.e., 100% duty cycle for all but the last clock in a gap run-length), the difference between these temperatures is much larger. Thus serration of the laser power by preheat pulsing results in a much smaller difference in media temperature between the start and step of a gap run-length. The pulse writing and preheat scheme depicted in FIGS. 10A and 10B is summarized below.

TABLE 4

| Laser Pulse Patterns for FIGS. 10A and 10B | | |
|---|---|---|
| Run Length | Laser Pulse Patterns | |
| | Mark | Gap |
| 2 T | AT | EP |
| 3 T | ACT | PEP |
| 4 T | APAT | EPEP |
| 5 T | ACPAT | PEPEP |
| 6 T | APBPAT | EPEPEP |
| 7 T | ACPBPAT | PEPEPEP |
| 8 T | APBPBPAT | EPEPEPEP |

All mark run lengths (FIG. 10A) are written the same as in FIG. 4A.

Figure 12:
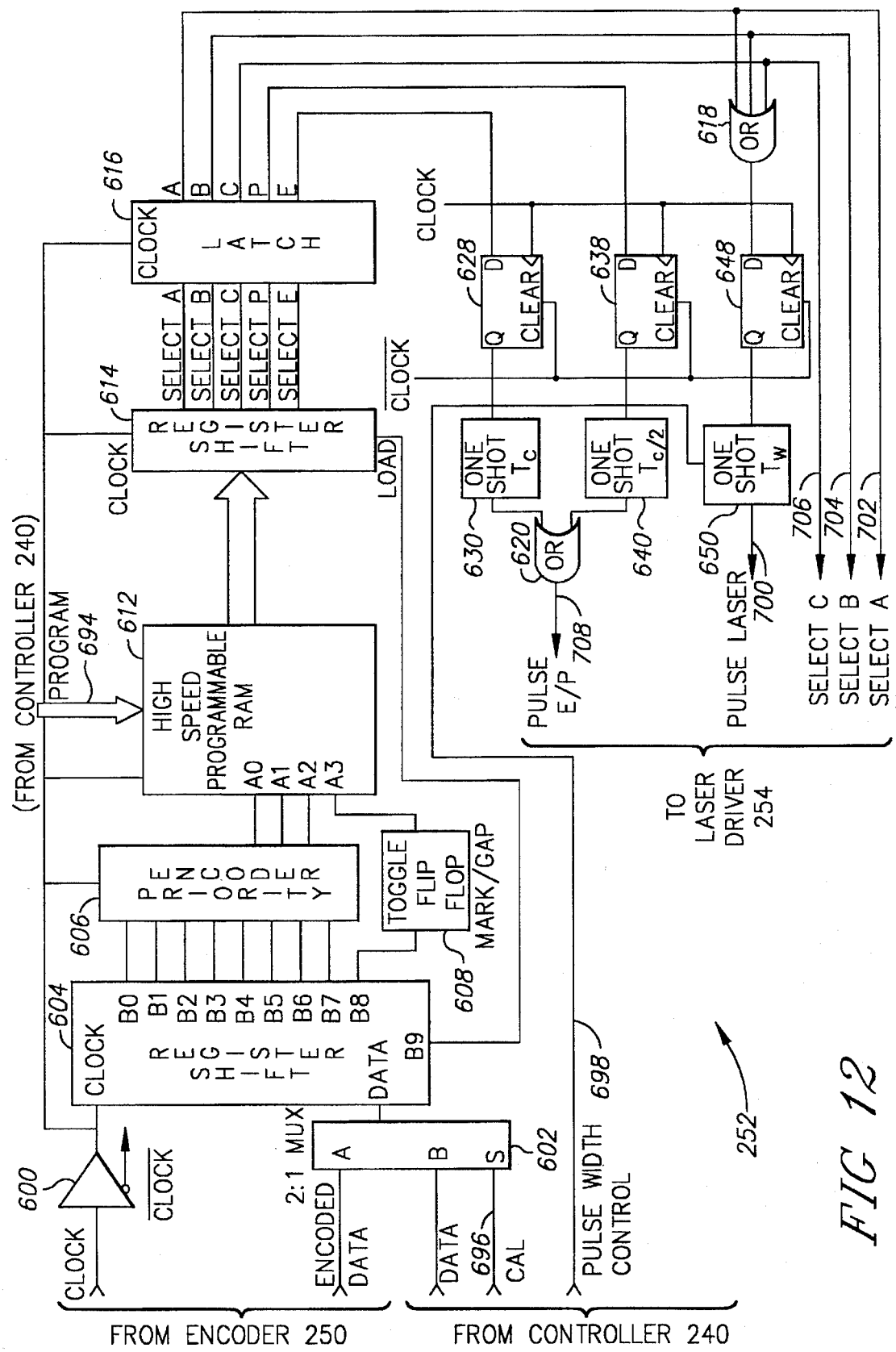
FIG. 12 is a circuit diagram of the programmable laser driver modulator shown in FIG. 1.

Operation of the Programmable Modulator and Laser Driver for Programmed Pulsed Writing and Preheating FIG. 12 is a circuit diagram of a preferred embodiment of the programmable modulator 252 that implements the edge writing algorithm shown in FIGS. 4A–4B for a (1,7) RLL code. The logic circuitry is a programmable state machine that detects the mark/gap run-lengths from PWM encoder 250 (FIG. 1) and pulses the laser accordingly through outputs to laser driver 254 (FIG. 1). Modulator 252 comprises a clock buffer 600, a multiplexor 602, a plurality of shift registers 604 and 614, a priority encoder 606, a toggle flip-flop 608, logic gates 618 and 620, a high speed programmable RAM 612, a resettable latch 616, a plurality of D flip-flops 628, 638, 648, and a plurality of single-shots 630, 640, 650. The modulator 252 provides modulation signals for the laser driver 254 to drive the laser 150 at any of three distinct pulse writing power levels (A, B or C) and a single preheat power level (P). The laser power levels are defined by the laser driver 254. Modulator 252 also generates the 0%, 50%, and 100% of Tc preheat pulse widths. Modulator 252 receives the data signal from encoder 250 and converts it into instructions to the laser driver 254 for writing the pattern, including the preheat pulse pattern. The output of flip-flop 608 is either a "1" state (indicating a mark) or a "0" state (indicating a gap). Output lines 700–708 lead to the laser driver 254. Lines 702, 704, 706 select the power level A, B, and C, respectively, while line 700 is raised for the duration of the actual write pulse (i.e., time Tw). Line 708 selects a preheat pulse and has duration of 0%, 50%, or, 100% of Tc. A preheat pulse at power level P for 100% Tc is designated as an E pulse in FIG. 12. Only one of the lines 702, 704, 706, or 708 will be raised at a time and this informs the laser driver 254 which power level to use. The single-shot 650 controls the duration of the laser pulse for writing pulses A, B and C. Single-shot 640 sets the duration of the P pulse at Tc/2 and single-shot 630 sets the duration of the E pulse at Tc. While the outputs of single-shots 630 and 640 scale with Tc, the output of single-shot 650 is independent of Tc and is set by analog control line 698 to a preferred value. This writing pulse duration Tw should be as short as possible and is approximately 10–20 ns or less in the preferred embodiment. The writing pulse duration Tw must be less than the clock period Tc at the outer track of the disk. This clock period Tc will depend upon the disk size and rotational speed and is approximately 35 ns at the disk innermost track in the preferred embodiment. Another advantage of short duration laser write pulses is that there is a reduction in "jitter". Jitter is a measure of the deviation of the mark transitions from their ideal locations.

The operation of programmable modulator 252 is explained as follows. The outputs of encoder 250 are a clocking line and two data lines. The first data line (at input A of multiplexor 602) represents encoded data from encoder 250. The second data line (at input B of multiplexor 602) represents unencoded data which has bypassed the encoder 250. This unencoded data stream is required since the calibration sequence used to determine the optimum preheat pattern as described below is not a valid code sequence and hence cannot be generated by the encoder. The controller 240 selects via multiplexor 602 control line 696 which of these two data streams is to be processed by the programmable modulator. The selected data stream is shifted bit by bit into shift register 604 and presented in parallel to priority encoder 606 which encodes the run-length and presents the result as the three lowest order address bits (A0, A1, A2) of high speed programmable RAM 612. The highest order address bit (A3) for RAM 612 is derived from toggle flip-flop 608 which changes state each time a leading or trailing edge is shifted through the shift register 604. The output of flip-flop 608 thus represents whether a mark run-length or a gap run-length is being processed by the modulator 252. RAM 612 contains the mark run-length and gap run-length laser pulse patterns, such as that shown in FIGS. 4A-4B and represented in Table 1, which are programmed via the controller lines 694 from controller 240. Any of the modulation patterns represented by Tables 1–4 could be programmed into RAM 612. The RAM data is loaded with a one clock delay into shift registers 614 and clocked out to latch 616. If the data in RAM 612 indicates that an A, B, or C power level pulse is to occur on a particular clock cycle, OR gate 618 sets D flip-flop 648 which triggers single-shot 650 to pulse line 700 while lines 702, 704, or 706, respectively, indicate the selected power level to the laser driver 254. The output of D flip-flop 648 is cleared by clockbar (clock with bar over it as shown in FIG. 12) in the case of an A, B, or C pulse, thereby allowing single-shot 650 to be retriggered on the next clock cycle if required. If RAM 612 indicates a P pulse is to occur on a particular clock cycle, D flip-flop 638 is set, single-shot 640 is triggered and line 708 to the laser driver 254 is strobed for time Tc/2 via OR gate 620. Similarly, if RAM 612 indicates an E pulse is to occur on a particular clock, D flip-flop 648 is set, single-shot 630 is triggered and line 708 to laser driver 254 is strobed for time Tc via OR gate 620.

The output of D flip-flop 638/628 is cleared by clockbar in the case of an E/P pulse, thereby allowing single shot 630/640 to be retriggered on the next clock cycle if required, respectively.

Figure 13:
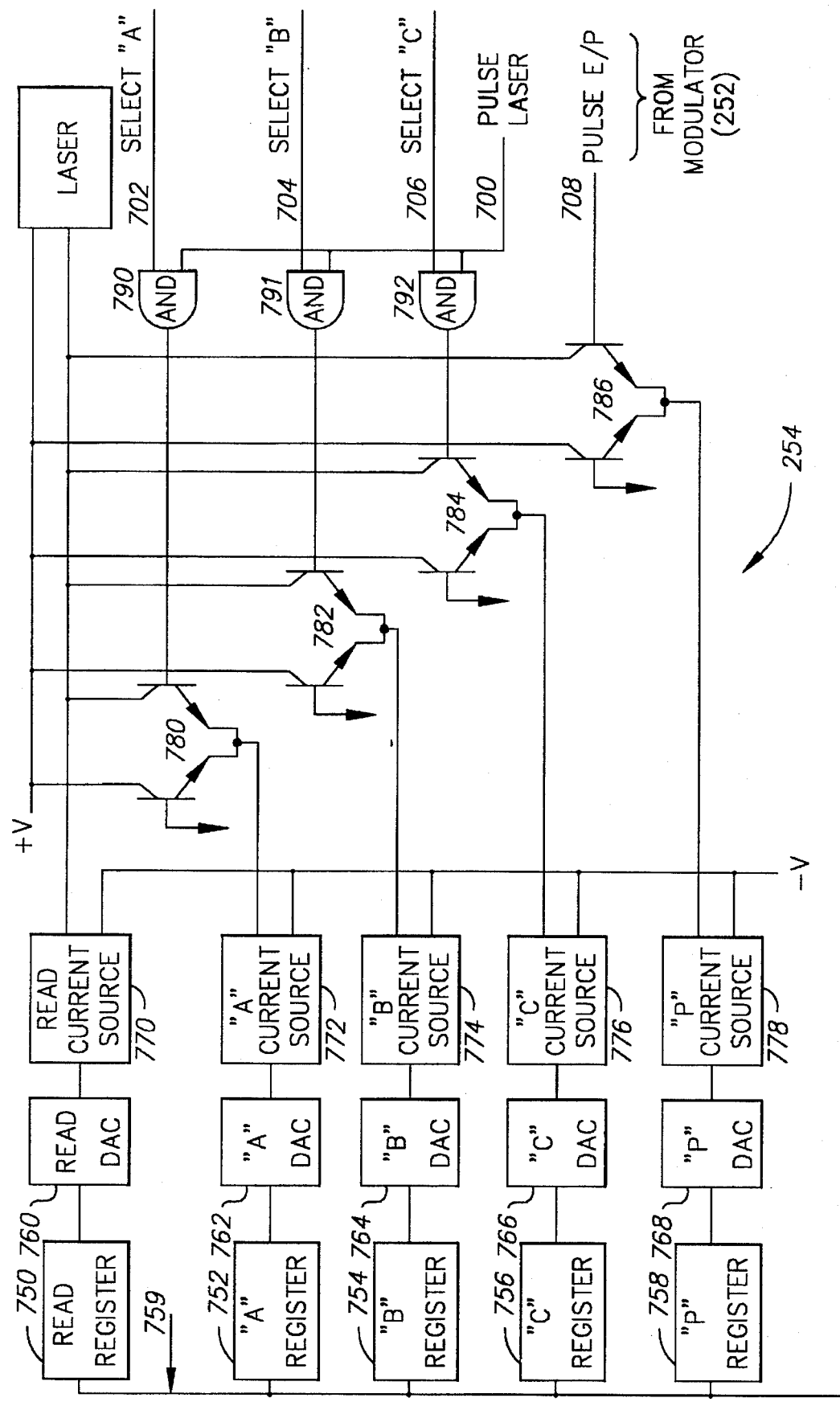
FIG. 13 is a circuit diagram of the laser driver shown in FIG. 1.

FIG. 13 is a circuit diagram illustrating the preferred embodiment of laser driver 254. Driver 254 comprises a plurality of registers 750–758, a plurality of digital to analog converters (DACs) 760–768, a plurality of current sources 770–778, and a plurality of transistor pairs 780–786. The disk drive controller 240 is connected to the registers 750–758 via a bus 759. Controller 240 sets the current level of each of the current sources 770–778 via their associated registers 750–758 and DACs 760–768. For example, when recorded data is to be read controller 240 sends a digital signal representing the appropriate read power level via bus 759 to register 750. Register 750 holds this digital value and provides it to DAC 760 which converts it to a corresponding analog signal which represents the appropriate current level to be supplied to read current source 770. The read current source 770 then is adjusted to the appropriate power level to supply to laser 150.

For the laser driver described above, the current sources 770–778 are adjusted to achieve the laser power level desired at the media. The read current source 770 provides enough current such that laser 150 does not heat the media above its Curie temperature. Write current sources 772, 774 and 776 for power levels A, B and C, respectively, are set in conjunction with preheat current source 778 for power level P such that the mark/gap run-lengths are written correctly according to the patterns described above. Lines 702, 704, 706 from modulator 252 are connected via AND gates 790, 791, 792 to transistor pairs 780, 782, and 784, respectively. These transistors allow additional current from the current sources 772, 774, 776, respectively, to flow to laser 150 when these lines are raised. Thus laser 150 will be raised to one of the higher power levels A, B, or C for the duration of single-shot 650 (in modulator 252 in FIG. 12) for write pulses and to preheat power level P for the duration of the raised level of line 708 for preheat pulses, as required to write the desired data pattern. In the preferred embodiment, with a pulse duration of 15 ns or less, the power level A is approximately 20 mW at the media and power level P is approximately 2 mW at the media.

In operation, the read current source 770 is set to provide read current to laser 150 during read operations only; i.e., it is reduced to the laser threshold current for the duration of the write operation. Laser 150 is always either on at the read power level (during reading and when not reading or writing) or pulsing from the laser threshold level to power levels A, B, C and P (during writing). This ensures there is enough reflected light for correct focus and tracking servo operation.

Calibration of the Laser Pulse Patterns

In order to choose the correct laser pulse sequence to be used on a particular media it is necessary to identify the media type and to have a measure of the characteristic thermal interference to be expected when recording on the media. The media type can be obtained by reading information in the manufacturer's reserved area of the disk which contains embossed prerecorded information as is known in the art. The characteristic thermal interference to be expected when recording on the media can be determined either from information contained in the manufacturer's reserved area of the disk, or more preferably, from direct measurement during actual drive operation. This direct measurement requires trial writing of a calibration sequence on the media, reading of the sequence, and a measurement technique.

Figure 14A:
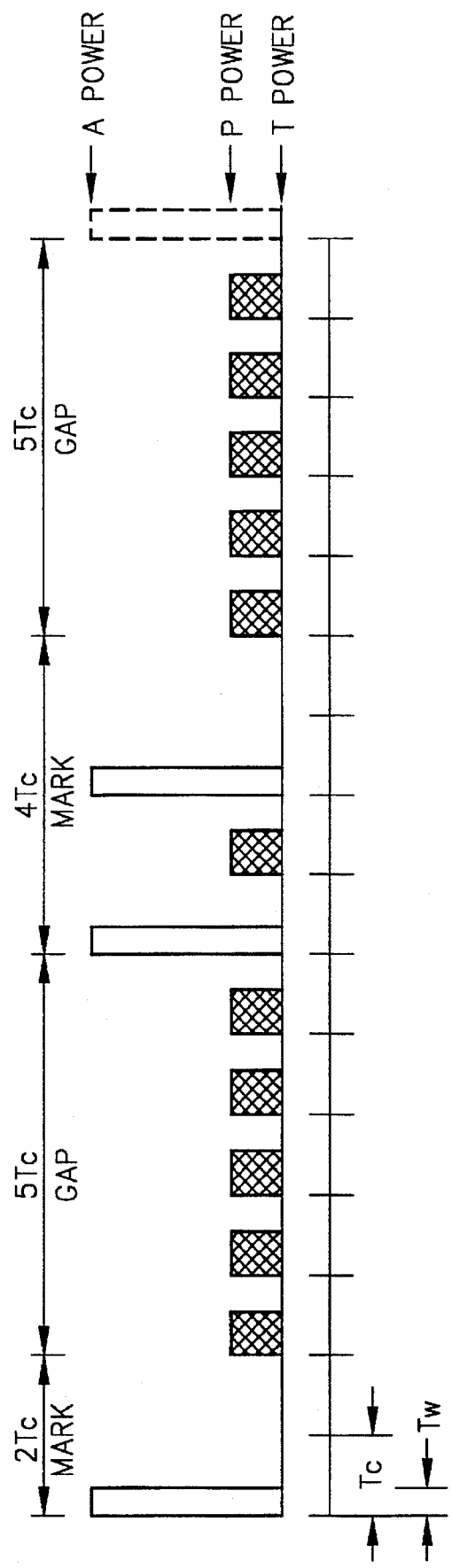
FIG. 14A and 14B are schematic diagrams of the E(th) sequence used to calibrate the laser write and preheat pattern for the d,k constrained (1,7) RLL code.
Figure 14B:
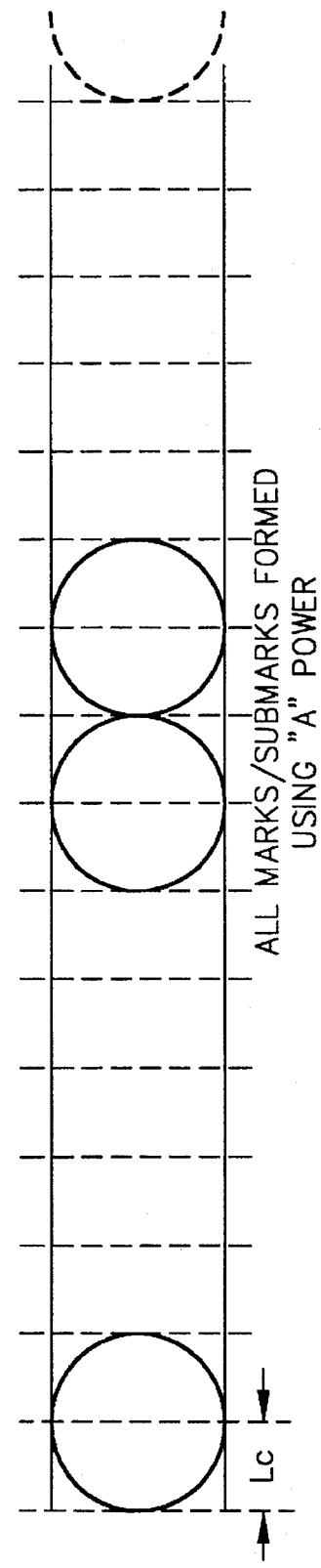

The preferred calibration sequence used to measure the thermal interference in the media is a repeating {4 Tc Mark, 5 Tc Gap, 2 Tc Mark, 5 Tc Gap} sequence. This sequence is referred to as the E(th) sequence, for E(rror) Th(ermal), and is shown in FIGS. 14A–14B. This is similar to the E(th) sequence {4 Tc Mark, 6 Tc Gap, 2 Tc Mark, 6 Tc Gap} known in the art which is used by disk manufacturers to ensure that the media conforms to international performance standards. This latter E(th) sequence is related to the E(th) defined in FIGS. 14A–14B herein but is measured under specific controlled conditions which may be significantly different than those experienced in an actual optical disk drive. The preferred embodiment of the E(th) sequence described here is applicable to a d,k (1,7) RLL code but extensions to other d,k codes is readily accomplished by those skilled in the art. This pattern is chosen since it is optically symmetric and any asymmetry which is observed is due to thermal interference between the two A pulses, which are generally at the middle of the pattern and are used to form the submarks of the 4 Tc mark run-length (FIG. 14B). The asymmetry is calculated as a thermal interference value E(th) from the following formula:

$$E(th) = \frac{L_{4T} - L_{2T} - 2Tc}{Tc} \qquad \text{Eq. (1)}$$

This equation is computed as an average of a number of E(th) sequences that have been written on the disk at an A power level. The correct A power level is the one where the average 5 Tc gap run-length is precisely 5 Tc in length:

$$\langle L_{5T} \rangle = 5Tc \qquad \text{Eq.(2)}$$

The value of Tc can be determined from the read back signal using:

$$Tc = \frac{L_{4T} + L_{2T} + 2\langle L_{5T} \rangle}{16} \qquad \text{Eq. (3)}$$

In the above equations, $L_{4T}$ is the length of the 4 T mark run-length, $L_{2T}$ is the length of the 2 T mark run-length, and, $\langle L_{5T} \rangle$ is the average of the two 5 Tc gap run-lengths in the written E(th) sequences.

Figure 15:
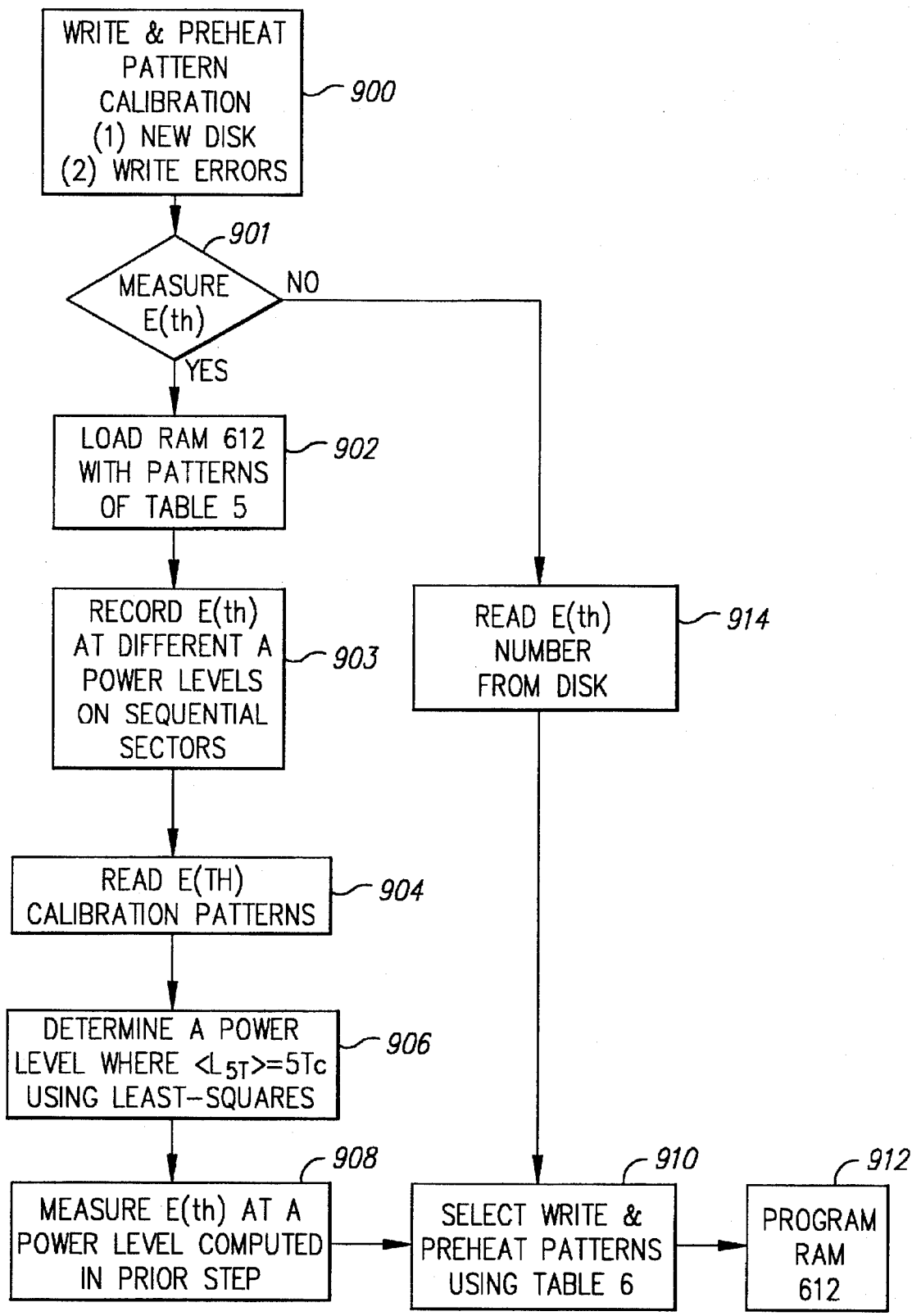
FIG. 15 is a flow chart showing the steps in writing the calibration sequences, reading the calibration sequences, and calculating a thermal interference value to adjust the write and preheat patterns.

The operation of the system during measurement of E(th) is detailed in the flow chart of FIG. 15. First, at initial step 900 the write and preheat patterns are calibrated when a new disk is inserted into the disk drive or when write errors have exceeded some predetermined threshold. In the preferred embodiment E(th) is determined by actual measurement, although at decision block 901 E(th) can be read from the disk.

Since it is likely that the E(th) sequence is not a valid code sequence, it is programmed directly from the controller 240, bypassing the encoder 250 and injected directly into modulator 252 via multiplexor 602. At step 902 programmable RAM 612 is loaded with the laser pulse patterns indicated in FIG. 14A as shown in Table 5.

TABLE 5

| Laser Pulse Sequence for FIGS. 14A and 14B | | |
|---|---|---|
| Run | Laser Pulse Sequence | |
| Length | Mark | Gap |
| 2 T | AT | — |
| 4 T | APAT | — |
| 5 T | — | PPPPP |

In order to find the A power where Eq. (2) holds, the E(th) sequence is then recorded at varying A power levels on sequential sectors of the optical disk at step 903. Next, each of these written calibration sectors is read at step 904. The quantity $\langle L_{5T} \rangle$ is measured at each sector and a least-squares analysis is used at step 906 to determine the optimum A power level where Eq. (2) holds. Once this power is determined, at step 908 the value of E(th) is calculated for the E(th) sequences written at this optimum A power level using Eq. (1). The term Tc needed for Eq. (1) is calculated from Eq. (3) from the read back signal for the sequence written at the optimum A power level.

Table 6 shows three sets of write patterns and three sets of preheat patterns corresponding to the various ranges of E(th) values for the case of M-O media. At step 910 the correct sets of write and preheat patterns are selected from a look-up table containing the data of Table 6, based on the value of E(th) measured in step 908. The look-up table is stored in conventional ROM or other conventional storage device accessible by controller 240.

TABLE 6

| | Laser Pulse Patterns for M-O Media vs. E(th)(%) Value | | | | | |
|---|---|---|---|---|---|---|
| | Laser Pulse Patterns | | | | | |
| Run | E(th) < 10% | | 10% < E(th) < 25% | | E(th) > 30% | |
| Length | Mark | Gap | Mark | Gap | Mark | Gap |
| 2 T | AT | PP | AT | PT | AT | TT |
| 3 T | ABT | PPP | ACT | PPT | ACT | PTT |
| 4 T | APAT | PPPP | APAT | PPPP | APBT | PPPT |
| 5 T | ABPAT | PPPPP | ACPAT | PPPPP | ACPBT | PPPPP |
| 6 T | APAPAT | PPPPPP | APBPAT | PPPPPP | APBPBT | PPPPPP |

TABLE 6-continued

Laser Pulse Patterns for M-O Media vs. E(th)(%) Value

| Run Length | Laser Pulse Patterns | | | | | |
|---|---|---|---|---|---|---|
| | E(th) < 10% | | 10% < E(th) < 25% | | E(th) > 30% | |
| | Mark | Gap | Mark | Gap | Mark | Gap |
| 7 T | ABPAPAT | PPPPPPP | ACPBPAT | PPPPEEP | ACPBPBT | PPPPEEP |
| 8 T | APAPAPAT | PPPPPPPP | APBPBPAT | PPPPPEEP | APBPBPBT | PPPPPEEP |

The pulse writing patterns are programmed into RAM 612 at step 912.

A first set of write and preheat pulse patterns is shown in Table 6 for E(th) between 10 and 25 percent. Disks with measured E(th) between 10–25% are considered to be nominal and do not require modification of the write patterns or preheat patterns. Thus the sets of write and preheat patterns for media in this range of E(th) are identical to the sets shown in FIGS. 4A–4B and Table 1. However, high E(th) disk media (greater than approximately 30%) require modifications of both the write and preheat patterns. High thermal interference media needs to cool more on short gaps, and therefore the modification of the preheat patterns is to remove preheat pulses in short gaps. Similarly the requirement for more cooling means that the modification of the write patterns is to reduce the power level from A to B for submarks that are separated by 2 Tc. In contrast, low thermal interference media does not need to cool as much in the short gaps, and therefore no P power level pulses are removed in the short gap run-length preheat patterns (e.g., no T power levels are used in the 2 Tc and 3 Tc gap run-lengths). Similarly, no C power level pulses are needed in the write patterns for low thermal interference media.

The specific patterns in Table 6 are determined experimentally by writing different sequences on disks with known values for E(th) and then selecting the sequence that best compensates for E(th) of known values. The selected optimum patterns are then stored in memory accessible by controller 240. When a new disk or disk type is used in the optical disk drive, or when a high number of data errors are detected with an existing disk, the procedure of FIG. 15 is run and the controller 240 uses the measured value of E(th) to enter a look-up table to select the correct write and preheat patterns to program RAM 612.

While in the preferred embodiment the value of E(th) is measured from a series of E(th) sequences written onto the disk by the disk drive, it is also possible to determine E(th) from a thermal interference E(th) number prewritten on the disk by the disk manufacturer. This portion of the process is shown in FIG. 15 when the result of the "Measure E(th)?" decision block 901 is a "No". This is shown as step 914 in FIG. 15. In this method the disk drive manufacturer would use disks with different E(th) numbers to experimentally determine the correlation between the pre-written E(th) number and the optimum sets of write and preheat pulse patterns. The sets of patterns would then be stored in memory in the disk drive and when a E(th) number is read off a new disk, a look-up table is entered to select the correct sets of write and preheat patterns to program into RAM 612.

While the three sets of patterns shown in Table 6 are for M-O media, the basic concept of using different sets of patterns selected according to measured values of E(th) is fully extendible to other media types.

Steps 904 and 908 require reading the calibration sequences to measure the mark and gap lengths so that equations 1–3 can be calculated. The circuitry and method for reading the calibration sequences will be described below.

Circuitry and Method for Reading Calibration Sequences

Figure 16:
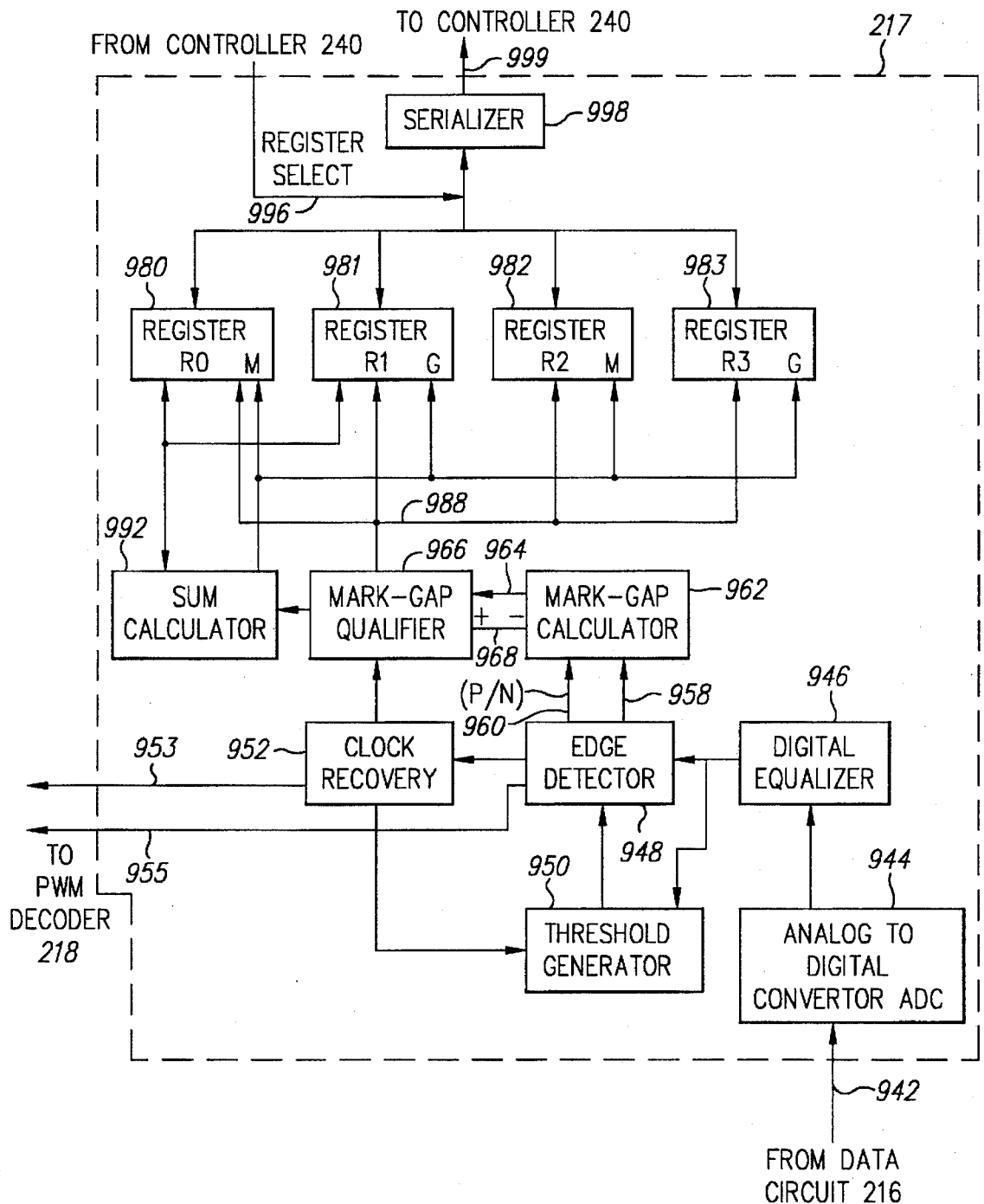
FIG. 16 is a detailed block diagram of the read circuitry for reading the calibration sequences to determine the mark and gap run-lengths as part of the adjustment of the write and preheat patterns.

The following description pertains to processing one sector of a calibration sequence, it being understood that many calibration sectors are involved in each calibration procedure. FIG. 16 is a detailed block diagram of the read detector 217 (FIG. 1) and will explain the read operation to calculate the run-lengths in order to determine E(th). Analog read signals from data circuit 216 (FIG. 1) are sent on line 942 to an analog-to-digital convertor (ADC) 944 in read detector 217 for conversion into a sequence of multidight digital signals. The sequence of digital signals represents the amplitudes of the read signals with respect to time. Digital equalizer 946 processes the digital signal output of ADC 944 to supply a sequence of equalized digital signals to edge detector 948 and threshold detector 950. Clock recovery circuit 952 is connected to edge detector 948 and threshold generator 950 in a read back clock servo loop, i.e., to generate a clock or timing signal based upon detecting transitions recorded on the optical disk. Edge detector 948 supplies to mark-gap calculator 962 a sequence of detected transition-time indicating digital signals over multiline bus 958. A transition-time indicates time of occurrence of a transition recorded on an optical disk, such as a magnetic transition in a M-O disk. A sign P/N (indicates positive transition P or negative transition N) signal on line 960 indicates transition-time polarity associated with each multidigit digital representation of the transition-time. Mark-gap calculator 962, for distinguishing between marks and gaps, calculates the difference between two successive digitally-indicated transition-times. A read mark is indicated by a digitally-indicated leading positive (P) transition-time derived from a recorded mark-leading transition followed by a digitally-indicated trailing negative (N) transition-time derived from a recorded mark-trailing transition. A read gap is correspondingly indicated by a digitally-indicated trailing negative (N) transition-time derived from a recorded gap-leading transition followed by a digitally-indicated trailing positive (P) transition-time derived from a recorded gap-trailing transition. The digitally indicated transition-times are digitally amplitude qualified for rejecting noise. The edge detector 948 provides an output signal on line 955 and clock recovery circuit a clock signal on line 953, both of which are directed to PWM decoder 218 (FIG. 1) for use in the normal process of reading actual user data.

A magnetic polarity transition in the calibration sequence results in an analog transition in the read signals. The digital values in the digital signals indicate analog read signal amplitude. For example, a presence of a magnetic domain results in a maximum signal amplitude while absence of a magnetic domain is indicated by a minimum signal amplitude. This relationship of signal amplitude to the presence or absence of magnetic domains is based solely on circuit design. Amplitude qualification of the pulses is achieved by comparing the received digital signal values with a predetermined amplitude threshold value. A predetermined number of successive digital signals having values greater than the threshold value indicate the presence of a magnetic domain. The predetermined number is empirically determined to represent an amplitude that excludes noise.

Mark-gap calculator 962 orients its calculation based upon a sign for calculating duration of each mark, herein arbitrarily defined as elapsed time between a leading positive (P) transition-time and a trailing negative (N) transition-time. Similarly, gap durations are measured as elapsed time between a leading negative transition-time and a trailing positive transition-time.

Upon detecting either a mark or a gap, mark-gap calculator 962 sends a duration indicating digital signal over bus 964 to mark-gap qualifier 966. Simultaneously to the bus 964 signal, a mark (P) indicating signal on line 968 indicates a mark while a gap (N) indicating signal on line 968 indicates a gap. Marks alternate with gap indications. Mark-gap qualifier 966, timed by clock recovery circuit 952, measures durations of marks and gaps to ensure that each mark has a greater duration than a predetermined minimum duration but not exceeding a predetermined maximum duration. Gaps are duration qualified in the same manner. The minimums and maximums for marks and gaps are programmable by controller 240.

Synchronously to the first operation described above, second operations of the calibration circuitry in read detector 217 accumulate calibration data for forwarding to controller 240. The accumulated calibration data are forwarded to controller 240 at the completion of calibration operations in each calibration sector.

Four registers R0 980, R1 981, R2 982 and R3 983 accumulate the calibration data. The letters "M" and "G" in the registers respectively indicate that mark and gap calibration data are stored in the registers. Registers R0 980 and R1 981 respectively accumulate the total of mark and gap measured durations. Similarly, counting registers R2 982 and R3 983 respectively total the number of marks and gaps detected while reading the recorded calibration sequence. Accumulation of the calibration information is timed and sequenced by mark-gap qualifier 966. Upon completing qualifying any mark or gap, mark-gap qualifier 966 sends a gap/mark indicating signal over line 988 to registers R0-R3 to select registers R0 and R2 to accumulate mark information or registers R1 and R3 to accumulate gap information. Registers R2 and R3 respond respectively to the gap/mark indicating a mark or a gap to tally the number of marks and gaps that have been measured. Similarly, register R0 and R2 accumulate measured durations or widths of measured marks and gaps. A mark indicating signal on line 988 activates register R0 to an active condition and deactivates register R1. A gap indicating signal on line 988 activates register R1 to the active condition and deactivates register R0. Duration accumulation is achieved by mark-gap qualifier sending a measured duration to sum calculator 992. Sum calculator 992 has a multidigit adding register adder (not shown) for storing the received measured duration. Sum calculator 992 responds to receipt of the measured duration to read the active register R0 or R1 and add the contents of R0 or R1 to the just-received measured duration. The sum is then returned to the respective register R0 or R1 for accumulating all of the measured durations respectively for marks and gaps. The above-described operations are repeated until the entire calibration sector has been read.

Upon controller 240 detecting completion of reading each sector, it sequentially reads the contents of registers R0-R3 for calculating additional later-described calibration parameter data. Controller 240 supplies a register select signal on line 996 to activate serializer 998 to sequential read registers R0-R3, then serializes the read accumulated calibration data for transfer over line 999 to controller 240. Upon reading all four registers R0-R3, controller 240 resets registers R0-R3 for any ensuing calibration.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A pulse width modulation optical disk drive of the type wherein data is run-length-limited (RLL) encoded as mark run-lengths written on the disk by pulsed laser radiation, the disk drive comprising:

an optical disk having a thermally responsive data layer, the disk having recorded on it information representative of a characteristic thermal interference between mark run-lengths formed on the disk by the laser pulses;

a laser for generating a light beam directed to the disk to heat the thermally responsive data layer;

a motor for rotating the disk relative to the light beam;

a laser driver connected to the laser for pulsing the laser at a plurality of power levels above a threshold power level to write data on the disk;

a clock for generating timing signals with a characteristic cycle time;

a pulse width modulation data encoder operable in synchronization with the clock cycles and responsive to an input data stream for generating a data signal to be represented as mark run-lengths made on the disk by the laser pulses and gap run-lengths located between the mark run-lengths, a mark run-length being comprised of a single submark or a series of contiguous or overlapping submarks, each submark being made as a result of the laser being pulsed at one of the power levels;

a programmable modulator connected to the laser driver and responsive to the data signal from the data encoder for timing the laser to pulse according to a first set of write patterns of pulses, each write pattern of pulses in the first set corresponding to a respective mark run-length; and a controller responsive to the recorded characteristic thermal interference information on the disk for programming the modulator to time the laser to pulse according to a second set of write patterns of pulses different from said first set of write patterns, each write pattern of pulses in the second set corresponding to a respective mark run-length.

2. The disk drive of claim 1 wherein the modulator also times the laser to pulse during the gap run-lengths according to a first set of preheat patterns of pulses at a preheat power level less than the power level required to write data on the disk, each preheat pattern of pulses in the first set corresponding to a respective gap run-length.

3. The disk drive of claim 2 wherein the controller, in response to the recorded characteristic thermal interference information on the disk, also programs the modulator to time the laser to pulse according to a second set of preheat patterns of pulses different from said first set of preheat patterns, each preheat pattern of pulses in the second set corresponding to a respective gap run-length.

4. The disk drive of claim 3 further comprising memory storage coupled to the controller for storing a look-up table that includes (a) numbers representative of different values of characteristic thermal interference, (b) sets of write patterns, each write pattern set corresponding to one of the numbers in the look-up table, and (c) sets of preheat patterns, each preheat pattern set corresponding to one of the numbers in the look-up table.

5. The disk drive of claim 1 wherein the recorded characteristic thermal interference information on the disk is represented by a number recorded on the disk.

6. The disk drive of claim 1 wherein the recorded characteristic thermal interference information on the disk is represented by a calibration sequence of mark run-lengths and gap run-lengths recorded on the disk.

7. The disk drive of claim 6 further comprising memory storage coupled to the controller for storing the calibration sequence, wherein the controller sends the calibration sequence to the modulator for timing the laser to pulse according to the mark m-lengths and gap run-lengths in the calibration sequence, whereby the calibration sequence is recorded on the disk.

8. The disk drive of claim 6 further comprising read detection circuitry for measuring the lengths of mark run-lengths and gap run-lengths recorded on the disk and wherein the controller calculates a number representative of the characteristic thermal interference from said calibration sequence mark run-lengths and gap run-lengths measured by said read detection circuitry.

9. The disk drive of claim 1 further comprising memory storage coupled to the controller for storing a look-up table that includes (a) numbers representative of different values of characteristic thermal interference, and (b) sets of write patterns, each write pattern set corresponding to one of the numbers in the look-up table.

10. The disk drive of claim 1 wherein the disk is a magneto-optic (M-O) disk.

11. The disk drive of claim 1 wherein the disk is a phase-change write-once read-many (WORM) disk.

12. The disk drive of claim 1 wherein the disk is a rewriteable phase-change disk.

13. The disk drive of claim 1 wherein the disk has at least two magnetically coupled magnetic layers.

14. A pulse width modulation optical disk drive of the type wherein data is run-length-limited (RLL) encoded as mark run-lengths written on the disk by pulsed laser radiation and gap run-lengths between the mark run-lengths, the disk drive comprising:

an optical disk having a thermally responsive data layer, the disk having a thermal interference calibration sequence of mark run-lengths and gap run-lengths recorded on the disk;

a laser for generating a light beam directed to the disk to heat the thermally responsive data layer;

a motor for rotating the disk relative to the light beam;

a laser driver connected to the laser for pulsing the laser at a plurality of power levels above a threshold power level, one of said power levels being a preheat level less than the level required to write data on the disk;

a clock for generating timing signals with a characteristic cycle time;

a pulse width modulation data encoder operable in synchronization with the clock cycles and responsive to an input data stream for generating a data signal to be represented as mark run-lengths made on the disk by the laser pulses and gap run-lengths located between the mark run-lengths, a mark run-length being comprised of a single submark or a series of contiguous or overlapping submarks, each submark being made as a result of the laser being pulsed at one of the power levels above the preheat level;

a programmable modulator connected to the laser driver and responsive to the data signal from the data encoder for timing the laser to pulse according to a set of write patterns of pulses, each write pattern of pulses in the set corresponding to a respective mark run-length, and for timing the laser to pulse during the gap run-lengths according to a set of preheat patterns of pulses at the preheat power level, each preheat pattern of pulses in the set corresponding to a respective gap run-length;

read detection circuitry for measuring the lengths of mark run-lengths and gap run-lengths in the thermal interference calibration sequence recorded on the disk;

a controller for calculating a thermal interference value from the measured mark rim-lengths and gap run-lengths in the calibration sequence recorded on the disk and for programming the modulator to time the laser to pulse according to the set of write patterns and the set of preheat patterns; and a memory storage device coupled to the controller for storing a look-up table that includes (a) numbers representative of different values of thermal interference, (b) sets of write patterns, each write pattern set corresponding to one of the numbers in the look-up table, and (c) sets of preheat patterns, each preheat pattern set corresponding to one of the numbers in the look-up table;

and wherein the controller selects a set of write patterns and a set of preheat patterns from the look-up table as a result of the calculated thermal interference value and programs the modulator to time the laser to pulse according to said selected set of write patterns and said selected set of preheat patterns.

15. The disk drive of claim 14 further comprising memory storage coupled to the controller for storing the calibration sequence, wherein the controller sends the calibration sequence to the modulator for timing the laser to pulse according to the mark run-lengths and gap run-lengths in the calibration sequence, whereby the calibration sequence is recorded on the disk.

16. The disk drive of claim 14 wherein the disk is a magneto-optic (M-O) disk.

17. The disk drive of claim 14 wherein the disk is a phase-change write-once read-many (WORM) disk.

18. The disk drive of claim 14 wherein the disk is a rewriteable phase-change disk.

19. The disk drive of claim 14 wherein the disk has at least two magnetically coupled magnetic layers.

* * * * *